(12) United States Patent
Seiler et al.

(10) Patent No.: US 10,861,422 B1
(45) Date of Patent: Dec. 8, 2020

(54) DISPLAY RENDERING

(71) Applicant: Facebook Technologies, LLC, Menlo Park, CA (US)

(72) Inventors: Larry Seiler, Redmond, WA (US); Warren Andrew Hunt, Woodinville, WA (US)

(73) Assignee: Facebook Technologies, Inc., Menlo Park, CA (US)

( * ) Notice: Subject to any disclaimer, the term of this patent is extended or adjusted under 35 U.S.C. 154(b) by 0 days.

(21) Appl. No.: 16/542,762

(22) Filed: Aug. 16, 2019

(51) Int. Cl.
- *G09G 5/37* (2006.01)
- *G09G 5/02* (2006.01)
- *G06T 1/60* (2006.01)

(52) U.S. Cl.
CPC ............... *G09G 5/37* (2013.01); *G06T 1/60* (2013.01); *G09G 5/02* (2013.01); *G09G 2354/00* (2013.01); *G09G 2360/08* (2013.01)

(58) Field of Classification Search
CPC combination set(s) only.
See application file for complete search history.

(56) References Cited

U.S. PATENT DOCUMENTS

| | | | | |
|---|---|---|---|---|
| 2013/0100171 A1* | 4/2013 | Ohba | ........................ | G09G 5/34 345/672 |
| 2019/0158848 A1* | 5/2019 | Park | ..................... | H04N 19/152 |
| 2019/0362538 A1* | 11/2019 | Wong | ..................... | G06T 15/20 |

* cited by examiner

Primary Examiner — Wesner Sajous
(74) Attorney, Agent, or Firm — Baker Botts L.L.P.

(57) ABSTRACT

In one embodiment, a computing system may configure a first memory to store image data to be adjusted based on a user viewpoint. The system may configure a first processing module to generate adjusted image data based on a resampling process using a surface associated with the image data, the image data, and the user viewpoint. The system may configure a second processing module to generate adjusted image data by applying a transformation to the image data. The system may configure a controller to cause a number of second images to be generated at a second frame rate based on a first image stored in the first memory and generated at a first frame rate lower than the second frame rate. One or more of the second images may be selectively generated using (1) the first processing module or (2) the second processing module based on one or more criteria.

20 Claims, 15 Drawing Sheets

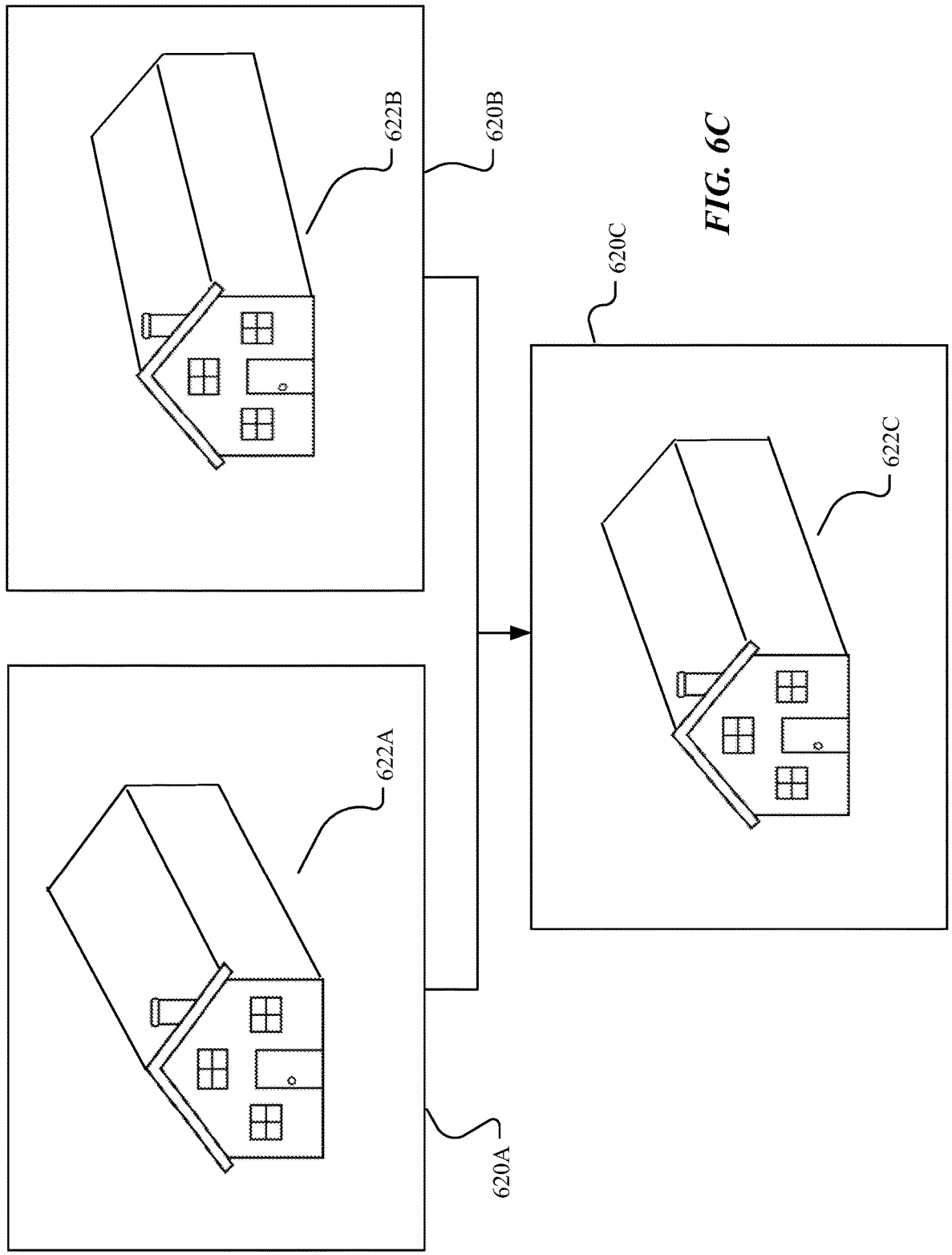

DISPLAY RENDERING

TECHNICAL FIELD

This disclosure generally relates to techniques for rendering graphics for artificial reality, such as virtual reality and augmented reality.

BACKGROUND

Artificial reality involves the display of computer-generated graphics to a user in an immersive manner. The goal is to cause the user to experience the computer-generated graphics as though they existed in the world before them. Rendering computer-generated graphics for artificial reality is a power-intensive and computationally-intensive task, often requiring expensive and specialized hardware. This is due at least in part to the requirement that the graphics displayed to the user must be generated at a very high frame rate. Insufficiently high frame rate causes a variety of undesirable effects. For example, the screen-door effect, where either the graphics or the display used to project the graphics allow the user to see lines between pixels can ruin any sense of immersion. Furthermore, graphics for artificial reality scenes are often interactive—when a user "moves" in the virtual space, the space moves with or in response to them. Latency between a user's movement, or movement command, and displaying the effects of that movement can cause great discomfort to the user, such as motion sickness. Increasing frame rate, however, is non-trivial, given the resource limitations (e.g., power, memory, compute, etc.) of artificial reality systems.

Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

SUMMARY OF PARTICULAR EMBODIMENTS

Particular embodiments described herein relate to systems and methods for low power AR/VR display rendering using one or more localized operations (e.g., 2D shifting or panning, parallax sub-frame interpolation, generating composite surface) within the local control units of a display engine to minimize the communication to external control units and reduce power consumption. The system may use a first processing module working in a full-pipeline mode (i.e., direct mode) or a second processing module using a low-power mode (i.e., frame storage mode) for rendering display content. In the full-pipeline mode using the first processing module, the display rendering process may include all steps of a rendering pipeline, such as, receiving mainframes from a body GPU, determining visibility and surface/tile pairs, re-sampling the surfaces using the surface/tile pairs and texels, making adjustments for display, etc. However, these pipeline steps (e.g., re-sampling) are not always necessary for display rendering, especially when the change of the scene/viewpoint is relatively slow (e.g., below a threshold change). In such situations, the system may work in the low-power rendering mode using the second processing module and localized transformative operations.

To support the low-power rendering mode, particular embodiments of the system may include two channels (e.g., a compressor channel and a decompressor channel) which directly connect the texel memory and the row buffer of the display engine. The texel memory may be loaded with the mainframes periodically (e.g., with 30-90 Hz master frame rate) and the row buffer may store the subframes (e.g., with 1-2 kHz subframe rate) for display. The rendering process may include inactive time periods during which mainframe data may be loaded into the texel memory. The inactive time periods may be between the active periods during which the subframes are rendered to physical display. The system may perform the localized low-power rendering operations (e.g., 2D shifting or panning, parallax sub-frame interpolation, generating composite surface) within the local control units of the display engine taking advantage of the inactive and active time periods. The system may compress one or more subframe images generated based on the mainframe image using the compressor channel and store the compressed subframe images in the texel memory. Then, the system may access and decompress the compressed subframe images in the texel memory using the decompressor channel and generate new subframes based on the decompressed subframe images using one or more localized transformative operations.

As an example, the system may compress and store a subframe into the texel memory (e.g., through the compressor channel between the texel memory and the row buffer) after the subframe has been generated by the full-pipeline process and loaded into the row buffer. When the viewpoint of the user does not change drastically, the system may generate next subframe by accessing and decompressing the stored subframe (e.g., through the decompressor channel) and simply shifting the accessed subframe (e.g., 2D shifting). Thus, for the next subframe, the system may not need to perform the costly operations (e.g., re-sampling operations) associated with the full-pipeline process and could reduce the power consumption for display rendering. As another example, after a subframe has been generated from a first viewpoint, the system may store the portion of the subframe corresponding to a surface in the texel memory. When a second subframe is generated from a second viewpoint, the corresponding surface may also be stored. Then, the system may generate next subframe from a third viewpoint using parallax interpolation based on the previously stored subframes of the first and second viewpoints instead of performing the full re-sampling process. As yet another example, after a subframe has been generated, the system may use the subframe to generate composite surfaces by combining those surfaces that are within same depth range or/and same X-Y coordinate range. These composite surfaces and the corresponding texel data may be stored and used to generate the next subframe. Although the pixel block will still be used to resample the composite surfaces, the reduction in the number of surfaces would improve the system performance and reduce the power consumption. In particular embodiments, the system may store the compressed subframes in the texel memory or a separate local memory in the system. As yet another example, the system may take advantage of the display's fast subframe rate and ability to display pixels as they become ready to provide flexible schedule for rendering different portions of the scene. For example, the system may change the order or frame rate of the subframes within a mainframe as long as the subframes are output within what humans can perceive (e.g., in the millisecond range). The system may render the simpler portions of the scene first and rendering the more complex portions of the scene later. By having this flexibility, the system may optimize resource allocation (e.g., bandwidth, computational resources, power) and improve the system performance for rendering display content.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 6C illustrates an example process for generating new subframe using parallax interpolation.

DESCRIPTION OF EXAMPLE EMBODIMENTS

Figure 1A:
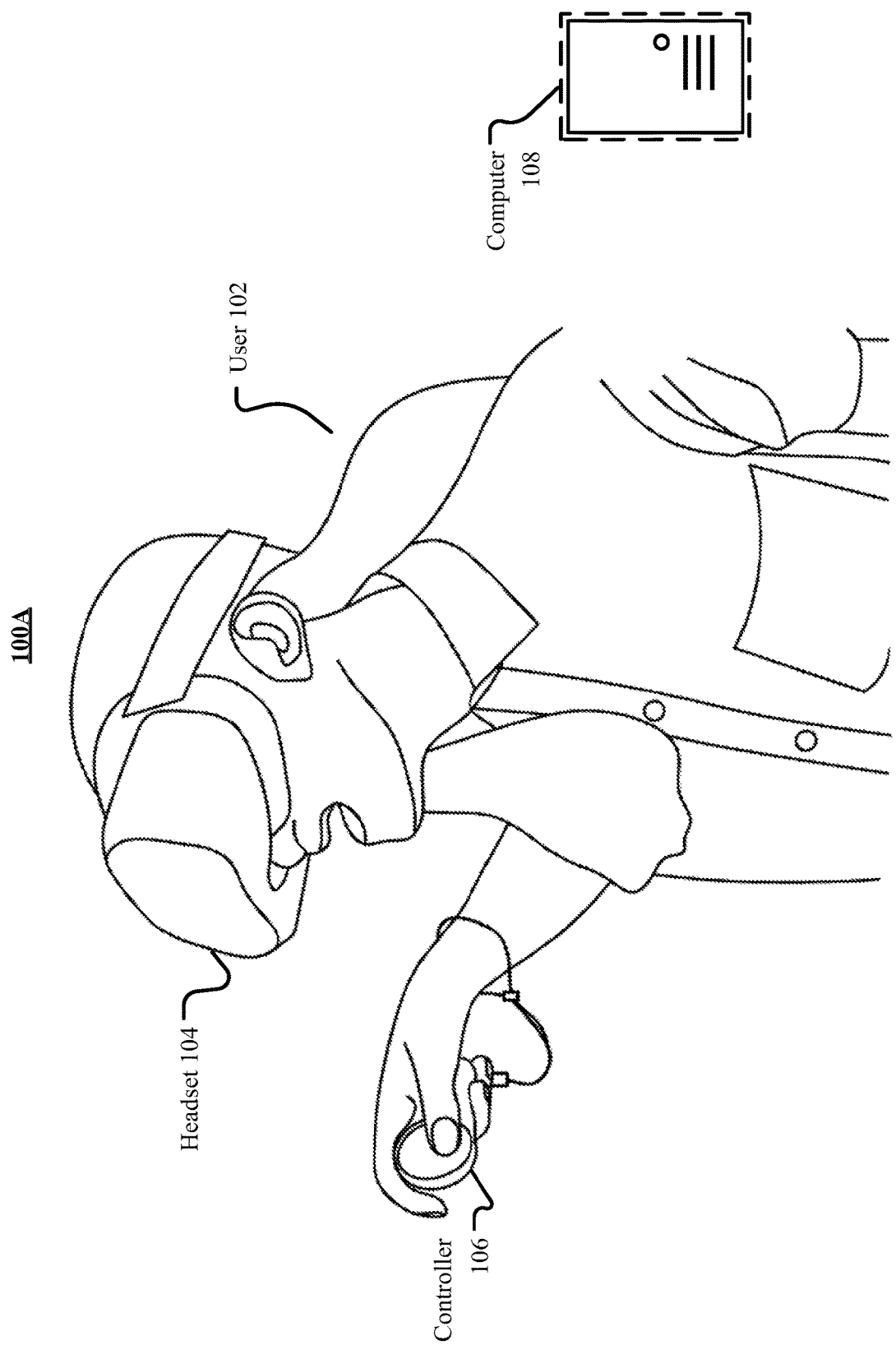
FIG. 1A illustrates an example artificial reality system.

FIG. 1A illustrates an example artificial reality system 100A. In particular embodiments, the artificial reality system 100 may comprise a headset 104, a controller 106, and a computing system 108, etc. A user 102 may wear the headset 104 that could display visual artificial reality content to the user 102. The headset 104 may include an audio device that could provide audio artificial reality content to the user 102. The headset 104 may include one or more cameras which can capture images and videos of environments. The headset 104 may include an eye tracking system to determine the vergence distance of the user 102. The headset 104 may be referred as a head-mounted display (HDM). The controller 106 may comprise a trackpad and one or more buttons. The controller 106 may receive inputs from the user 102 and relay the inputs to the computing system 108. The controller 106 may also provide haptic feedback to the user 102. The computing system 108 may be connected to the headset 104 and the controller 106 through cables or wireless connections. The computing system 108 may control the headset 104 and the controller 106 to provide the artificial reality content to and receive inputs from the user 102. The computing system 108 may be a standalone host computer system, an on-board computer system integrated with the headset 104, a mobile device, or any other hardware platform capable of providing artificial reality content to and receiving inputs from the user 102.

Figure 1B:
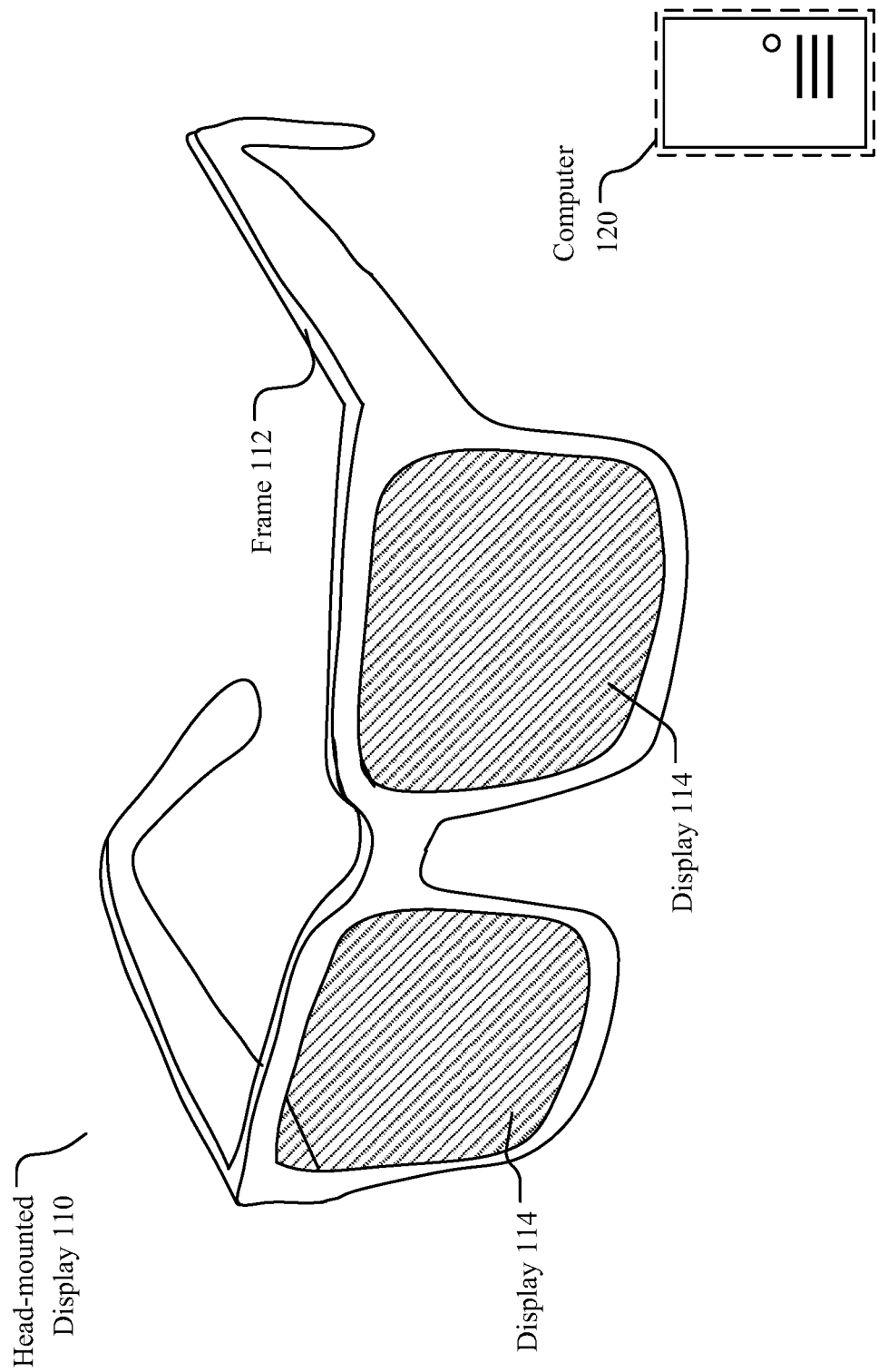
FIG. 1B illustrates an example augmented reality system.

FIG. 1B illustrates an example augmented reality system 100B. The augmented reality system 100B may include a head-mounted display (HMD) 110 (e.g., glasses) comprising a frame 112, one or more displays 114, and a computing system 120. The displays 114 may be transparent or translucent allowing a user wearing the HMD 110 to look through the displays 114 to see the real world and displaying visual artificial reality content to the user at the same time. The HMD 110 may include an audio device that may provide audio artificial reality content to users. The HMD 110 may include one or more cameras which can capture images and videos of environments. The HMD 110 may include an eye tracking system to track the vergence movement of the user wearing the HMD 110. The augmented reality system 100B may further include a controller comprising a trackpad and one or more buttons. The controller may receive inputs from users and relay the inputs to the computing system 120. The controller may also provide haptic feedback to users. The computing system 120 may be connected to the HMD 110 and the controller through cables or wireless connections. The computing system 120 may control the HMD 110 and the controller to provide the augmented reality content to and receive inputs from users. The computing system 120 may be a standalone host computer system, an on-board computer system integrated with the HMD 110, a mobile device, or any other hardware platform capable of providing artificial reality content to and receiving inputs from users.

Figure 2:
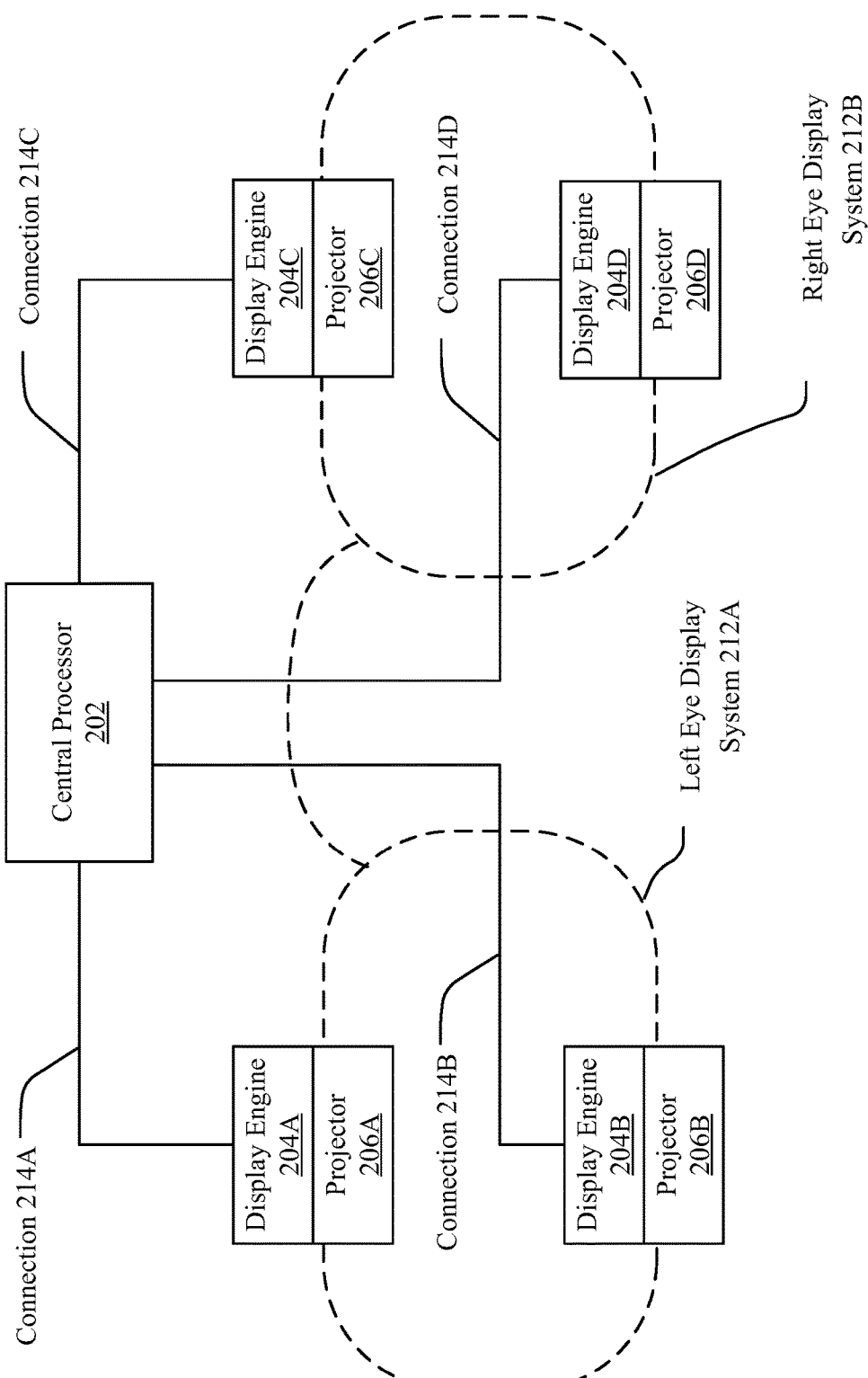
FIG. 2 illustrates an example AR/VR system architecture.

FIG. 2 illustrates an example AR/VR system architecture 200. In particular embodiments, the AR/VR system may include two eye display systems (e.g., left eye display system 212A, right eye display system 212B). Each eye display system may include two projectors (e.g., 206A-B for left eye display system 212A, 206C-D for right eye display system 212B) to achieve the desired field of view (FOV).

Each projector (e.g., 206A-D) may include three µLED backplanes (not shown) with each µLED backplane for one of RGB color. The µLED backplanes in each projector may be controlled by a display engine. For example, the projectors 206A-D may be controlled by and communicate with the display engine 204A-D, respectively. The system architecture 200 may include one or more central processors 202 which may control and communicate with all four display engines of 204A-D. The display engines 204A-D and projectors 206A-D may be synchronized and driven by the central processor 202 through communication channel connections of 214A-D, respectively. The display engine 204A-D may receive main frame image data (e.g., with frame rate of 20-90 Hz) from the central processor 202, generate subframe image data to be rendered (e.g., at frame rate of 2 kHz) using a graphic pipeline and based on the received main frame image data, and send the subframe image data to the respective projectors 206A-D for display. The communication channels or data buses between the display engines 204A-D and the respective projectors 205A-D may have high data bandwidth with short distance. In contrast, the communication channels 241A-D between the central processor 202 and the respective display engine 204A-D may have limited bandwidth with longer distance and may be power consuming for frequent data transmission.

Particular embodiments of the AR/VR systems may have limited available power (e.g., powered by battery). Frequent communication between the central control units (e.g., the central processor 202) and the local control units of the display engines (e.g., 204A-D) could be power consuming and have negative impact on the battery life of the AR/VR systems. To solve this problem, particular embodiments of the system may localize particular rendering operations (e.g., 2D shifting or panning, parallax sub-frame interpolation, generating composite surface) within the localized control units of the display engine 204A-D to minimize the communication to the central control units (e.g., central processor 202), and therefore reduces power consumption related to rendering display content. To further improve and optimize the system performance, particular embodiments of the system may use a flexible rendering schedule to render different portions of scene taking advantage of the display's fast subframe rate and ability to display pixels as they become ready. By having this flexibility, particular embodiments of the system optimize resource allocation (e.g., bandwidth, computational power) and improve the system performance for display rendering processes.

Figure 3A:
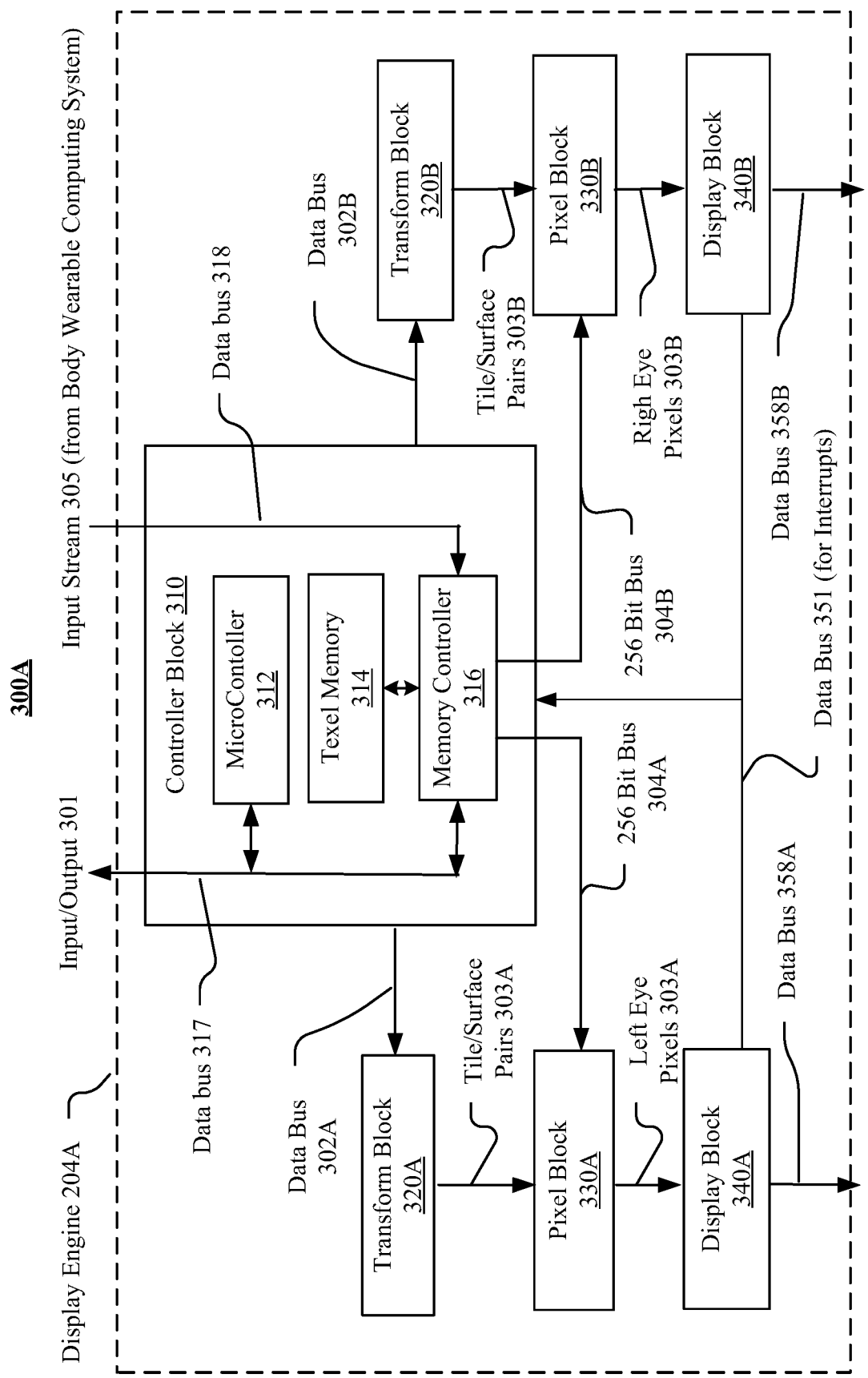
FIG. 3A illustrates an example diagram of display engine using a graphic pipeline to generate display image data.

FIG. 3A illustrates an example diagram 300A of display engine 204A using a graphic pipeline to generate display image data. In particular embodiments, the display engine 204A may include a control block 310, transform blocks 320A and 320B, pixel blocks 330A and 330B, display blocks 340A and 340B, etc. One or more of the components of the display engine 204A may be configured to communicate via a high-speed bus, shared memory, or any other suitable methods. For example, the control block 310 may be configured to communicate with the transform blocks 320A and 320B, pixel blocks 330A and 330B, and display blocks 340A and 340B via respective data bus (e.g., 304A-B, 306A-B, and 351). As explained in further detail herein, this communication may include data as well as control signals, interrupts or/and other instructions.

In particular embodiments, the controller block 310 may include a microcontroller 312, a texel memory 314, a memory controller 316, a data bus 317 for I/O communication (e.g., input/output 301), a data bus 318 for input stream data 305, etc. The memory controller 316 and the microcontroller 312 may be coupled through the data bus 317 for I/O communication with other modules of the system. The control block 310 may receive data and control packages such as position data and surface information though the data bus 317. The input stream data 305 may be input to controller blocks 310 from the body wearable computing system after being set up by the microcontroller 312. The input stream data 305 may be converted to the required texel format and stored into the texel memory 314 by the memory controller 316. In particular embodiments, the texel memory 314 may be static random-access memory (SRAM). In particular embodiments, the control block 310 may receive input from a body wearable computing system and initialize a graphic pipeline in the display engine to prepare and finalize the rendering for display. The data and control packets may include information such as one or more surfaces comprising texel data and position data and additional rendering instructions. The control block 310 may distribute data as needed to one or more other blocks of the display engine 204A. The control block 310 may initiate the graphic pipeline for processing one or more frames to be displayed. In particular embodiments, the two eye display systems 212A-B may each comprise a control block 310. In particular embodiments, the two eye display systems 212A-B may share a control block 310.

In particular embodiments, the transform blocks 320A and 320B may determine initial visibility information for surfaces to be displayed in the artificial reality scene. In general, the transform blocks 320A and 320B may cast rays from pixel locations on the screen and produce filter commands (e.g., filtering based on bilinear or other types of interpolation techniques) to send to the pixel blocks 330A and 330B. The transform blocks 320A and 320B may perform ray casting from the current viewpoint of the user (e.g., determined using the headset's inertial measurement units, eye trackers, and/or any suitable tracking/localization algorithms, such as simultaneous localization and mapping (SLAM)) into the artificial scene where surfaces are positioned and may produce results to send to the pixel blocks 330A and 330B.

In general, the transform blocks 320A and 320B may each comprise a four-stage pipeline, in accordance with particular embodiments. The stages of a transform block 320A or 320B may proceed as follows. A ray caster may issue ray bundles corresponding to arrays of one or more aligned pixels, referred to as tiles (e.g., each tile may include 16×16 aligned pixels). The ray bundles may be warped, before entering the artificial reality scene, according to one or more distortion meshes. The distortion meshes may be configured to correct geometric distortion effects stemming from, at least, the eye display systems the headset system. The transform blocks 320A and 320B may determine whether each ray bundle intersects with surfaces in the scene by comparing a bounding box of each tile to bounding boxes for the surfaces. If a ray bundle does not intersect with an object, it may be discarded. After the tile-surface intersections are detected, the corresponding tile-surface pairs may be passed to the pixel blocks 330A and 330B.

In general, the pixel blocks 330A and 330B may determine color values from the tile-surface pairs to produce pixel color values, in accordance with particular embodiments. The color values for each pixel may be sampled from the texel data of surfaces received and stored by the control block 310 (e.g., stored in texel memory 314). The memory controller 316 may be coupled to pixel blocks 330A and 330B through two 256-bit data buses 304A and 304B, respectively. The pixel blocks 330A and 330B may receive tile-surface pairs from the transform blocks 320A and 320B and may schedule bilinear filtering. For each tile-surface pair, the pixel blocks 330A and 330B may sample color information for the pixels within the tile using color values corresponding to where the projected tile intersects the surface. The pixel blocks 330A and 330B may determine pixel values based on the retrieved texels (e.g., using bilinear interpolation). In particular embodiments, the pixel blocks 330A and 330B may process the red, green, and blue color components separately for each pixel. In particular embodiments, the pixel block 330A of the display engine 204A of the first eye display system 212A may proceed independently, and in parallel with, the pixel block 330B of the display engine 204C of the second eye display system 212B. The pixel blocks 330A-B may then output its color determinations to the respective display blocks 340A-B. In particular embodiments, the pixel blocks 330A-B may composite two or more surfaces into one surface to when the two or more surfaces have overlapping areas. A composed surface may need less computational resources (e.g., computational units, memory, power, etc.) for the resampling process.

In general, the display blocks 340A and 340B may receive pixel color values from the pixel blocks 330A and 330B, covert the format of the data to be more suitable for the scanline output of the display, apply one or more brightness corrections to the pixel color values, and prepare the pixel color values for output to the display. In particular embodiments, the display blocks 340A and 340B) may each include a row buffer and may process and store the pixel data received from the pixel blocks 330A and 330B. The pixel data may be organized in quads (e.g., 2×2 pixels per quad) and tiles (e.g., 16×16 pixels per tile). The display blocks 340A and 340B may convert tile-order pixel color values generated by the pixel blocks 330A and 330B into scanline or row-order data, which may be required by the physical displays. The brightness corrections may include any required brightness correction, gamma mapping, and dithering. The display blocks 340A and 340B may output the corrected pixel color values directly to the driver of the physical display (e.g., pupil display) or may output the pixel values to a block external to the display engine 204A in a variety of formats. For example, the eye display systems 212A and 212B of the headset system 200 may comprise additional hardware or software to further customize backend color processing, to support a wider interface to the display, or to optimize display speed or fidelity.

In particular embodiments, graphics applications (e.g., games, maps, content-providing apps, etc.) may build a scene graph, which is used together with a given view position and point in time to generate primitives to render on a GPU. The scene graph may define the logical and/or spatial relationship between objects in the scene. In particular embodiments, the display engine 204A may also generate and store a scene graph that is a simplified form of the full application scene graph. The simplified scene graph may be used to specify the logical and/or spatial relationships between surfaces (e.g., the primitives rendered by the display engine 204A, such as quadrilaterals or contours, defined in 3D space, that have corresponding textures generated based on the mainframe rendered by the application). Storing a scene graph allows the display engine 204A to render the scene to multiple display frames, adjusting each element in the scene graph for the current viewpoint (e.g., head position), the current object positions (e.g., they could be moving relative to each other) and other factors that change per display frame. In addition, based on the scene graph, the display engine 204A may also adjust for the geometric and color distortion introduced by the display subsystem and then composite the objects together to generate a frame. Storing a scene graph allows the display engine 204A to approximate the result of doing a full render at the desired high frame rate, while actually running the GPU at a significantly lower rate.

Figure 3B:
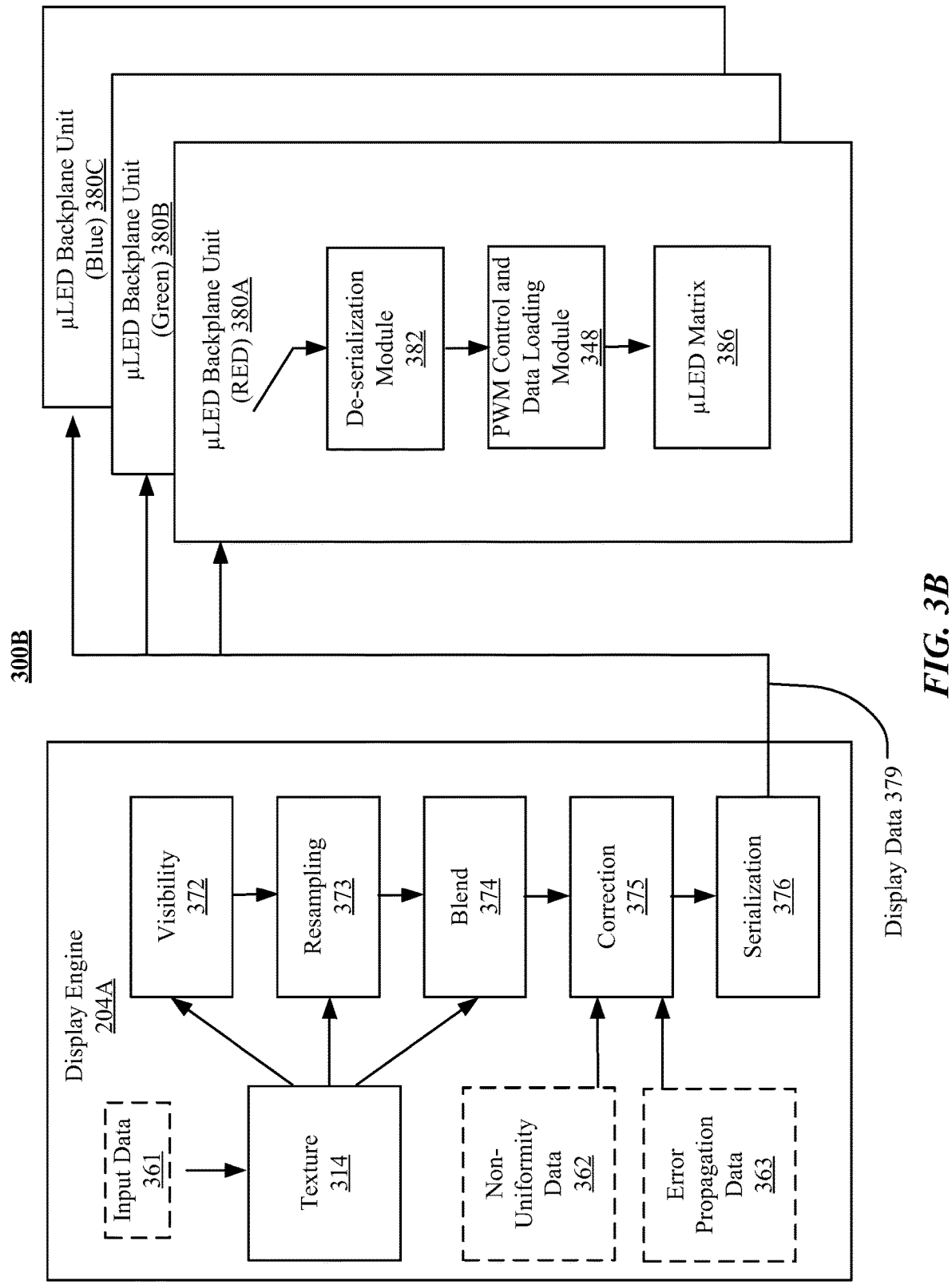
FIG. 3B illustrates an example graphic pipeline used by a display engine for generating display image data.

FIG. 3B illustrates an example graphic pipeline 300B used by a display engine 204A for generating display image data. In particular embodiments, the graphic pipeline 300B may include a visibility step 372, where the display engine 204A may determine the visibility of one or more surfaces received from the body wearable computing system. The visibility step 372 may be performed by the transform blocks (e.g., 320A and 320B in FIG. 3A) of the display engine 204A. The display engine 204A may receive (e.g., by control block 310 in FIG. 3A) input data 361 from the wearable computing system. The input data 361 may include one or more surfaces, texel data, position data, RGB data, and rendering instructions from the body wearable computing system. The input data 361 may include mainframe images with 30-90 frames per second (FPS) and 24 bits per pixel. The display engine 204A may process and save the received input data 361 in the texel memory 314. The received data may be passed to the transform blocks 320A and 320B which may determine the visibility information for surfaces to be displayed. The transform blocks 320A and 320B may cast rays for pixel locations on the screen and produce filter commands (e.g., filtering based on bilinear or other types of interpolation techniques) to send to the pixel blocks (e.g., 330A and 330B). The transform blocks 320A and 320B may perform ray casting from the current viewpoint of the user (e.g., determined using the headset's inertial measurement units, eye trackers, and/or any suitable tracking/localization algorithms, such as simultaneous localization and mapping (SLAM)) into the artificial scene where surfaces are positioned and produce surface-tile pairs to send to the pixel blocks 330A and 330B.

In particular embodiments, the graphic pipeline 300B may include a resampling step 373, where the display engine 204A may determine the color values from the tile-surfaces pairs to produce pixel color values. The resampling step 373 may be performed by the pixel blocks (e.g., 330A and 330B in FIG. 3A) of the display engine 204A. The pixel blocks 330A and 330B may receive tile-surface pairs from the transform blocks 320A and 320B and may schedule bilinear filtering. For each tile-surface pair, the pixel blocks 330A and 330B may sample color information for the pixels within the tile using color values corresponding to where the projected tile intersects the surface. The pixel blocks 330A and 330B may determine pixel values based on the retrieved texels (e.g., using bilinear interpolation) and output the determined pixel values to the respective display blocks 340A and 340B.

In particular embodiments, the graphic pipeline 300B may include a bend step 374, a correction step 375, a serialization step 376, etc. In particular embodiments, the bend, correction and serialization steps of 374, 375, and 376 may be performed by the display blocks (e.g., 340A-B in FIG. 3A) of the display engine 204A. The display engine 204A may blend the display content for display content rendering, apply one or more brightness corrections to the pixel color values, serialize the pixel values for scanline output for the physical display, and generate the display data 379 suitable for the μLED displays of the projectors. The display engine 204A may send the display data 379 to the μLED displays of the projectors. In particular embodiments, the system may include three μLED backplane units 380A, 380B, and 380C. Each μLED backplane unit of 380A, 380B, and 380C may include a de-serialization module 382, a PWM control and data loading module 348, and a μLED matrix 386. The display data 379 received from the display engine 204A may be de-serialized by the de-serialization module 382, loaded by the PWM control and data loading module 348, and displayed by the μLED matrix 386. In particular embodiments, the μLED display may run at 2 k subframes per second with 5 bits per pixel and may generate a data flow at 47 Gbps per color. The subframe images may be dithered (e.g., spatial or/and temporal dithering) to represent a color depth or grayscale of 8 bits.

Figure 4A:
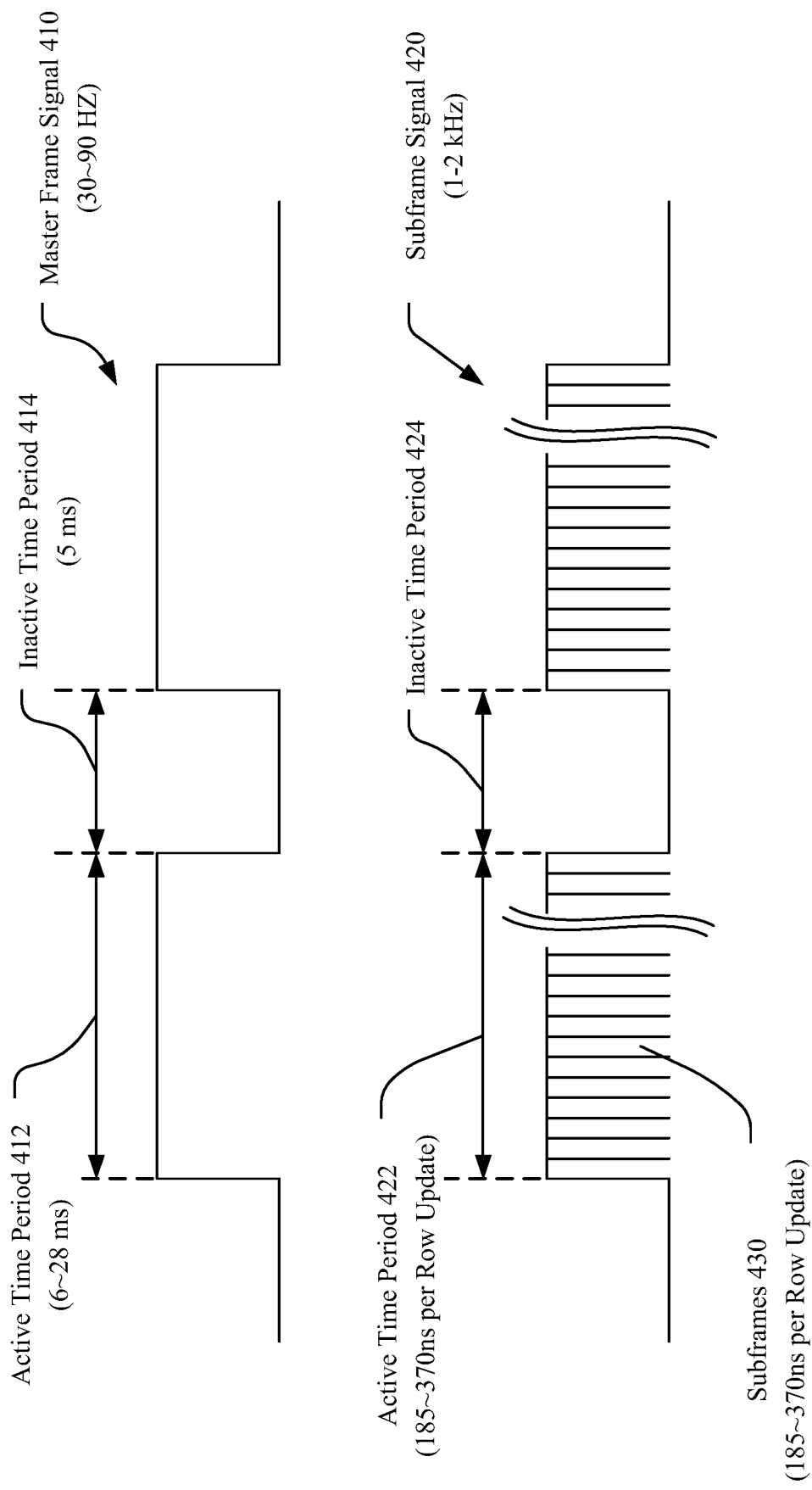
FIG. 4A illustrates an example master frame clock signal and subframe clock signal used by the display engine for rendering display content.

FIG. 4A illustrates an example master frame clock signal 410 and subframe clock signal 420 used by the display engine for rendering display content. In particular embodiments, the system may adopt a master-subframe rendering mechanism for loading mainframe image data with a master frame rate (e.g., 30-90 Hz) and rendering the subframe images to physical display with a subframe frame rate which is higher than the master frame rate (e.g., 1-2 kHz). This master-subframe rendering mechanism may allow the display engine of the AR/VR system to have flexible schedule on generating and rendering the display content, and therefore optimizes the computational resource allocation and improves the performance of the system. In particular embodiments, the display engine may load the image data from the central control units (which are external to the display engine) of the wearable computing system into the texel memory at a master frame rate of 30-90 Hz (e.g., 60 Hz) and render display content to physical display at a subframe rate of 1-2 kHz. The master frame clock signal 410 may include periodical time periods including the active time period 412 and inactive time period 414. In particular embodiments, the active time period 412 of the master frame clock signal 410 may have a length in a range of 6 ms to 28 ms and the inactive time period 414 may have a length about 5 ms. Mainframe image data may be updated or loaded into the texel memory of the display engine during the inactive time periods 412 of the periodical master frame clock signal.

After being loaded or updated into the display engine, the mainframe image data may be stored within the texel memory of the display engine. The display engine may use a graphic pipeline to generate display data for the physical display based on the mainframe image data. The display data for the physical display may include a number of subframes which may be rendered by the display at the subframe rate of 1-2 kHz based on the subframe clock signal 420. The subframe clock signal 420 may include periodical time periods including the active time periods 422, which corresponds to the active time period 412 of the master frame clock signal 410, and the inactive time periods 424, which corresponds to the inactive time period 414 of the master frame clock signal 410. The display content including the subframes 430 may be rendered to the physical display during the active time periods 422 at a subframe rate of 1-2 kHz (e.g., 185-270 ns per row update). During the inactive time periods 424, the display engine may not render any subframe to the physical display but may perform other operations, for example, adjusting the varifocal lens mechanically and other localized operations as will described in later sections of this disclosure. For the master-subframe rendering mechanism, the display engine may use the master frame rate for interfacing with up-stream modules (e.g., central control units of a wearable computing system) to receive mainframe images and render the subframe with a higher subframe rate to the physical display. The display engine can replay multiple frames and perform transformation or operations (e.g., color correction) on the subframes to generate display rendering results with a higher brightness, longer persistence, or/and improved bit depth.

Traditional GPUs and displays may adopt a fixed frame rate for rendering the display content. For example, traditional displays may output the pixels using line scanning according to a real-time fixed scanning clock. The pixels to be displayed in line-order (e.g., line by line) with each line scanning may be synchronized with the fixed scanning clock in real-time. This line scanning method using this hard real-time (i.e., with fixed real-time clock) display may require each frame to be on time as set by the scanning clock. The GPUs, which provide the display content to the display, need to generate each frame on time for the display hardware to scan out to meet the real-time scanning clock. Whenever a frame is generated later than the real-time scanning clock, the display may have to drop a frame, which may cause artifacts (e.g., flashing or jumping in the scene).

In contrast, particular embodiments of the AR/VR system may provide adaptive and flexible rendering operations based on perceptual needs of the user or/and based on status of computational resources of the system taking advantage of the master-subframe rendering mechanism and the high speed display (e.g., μLED display). Instead of using a hard-real-time frame rate (i.e., fixed real-time frame rate) like the traditional displays, particular embodiments of the system may adopt a soft real-time frame rate (i.e., flexible frame rate) for rendering the display content. In particular embodiments, the system may have a flexible master frame rate (e.g., 30-90 Hz) and a flexible subframe rate (e.g., 1-2 kHz). For example, the master frame clock signal and the subframe clock signal may both have active time periods and inactive time periods with flexible length (e.g., active time periods in the range of 6-28 ms and inactive time periods at about 5 ms). In particular embodiments, the subframe rate and the number of the subframes to be rendered within one active time period may change depending on the display needs and available computational resources (e.g., time, memory, computational units, power). For example, when the display engine needs longer time to generate a subframe image, the system may keep the display to wait until the subframe image is ready for rendering. Then, the system may have the physical display to scan out the subframe image data after the image data is ready for rendering. The system may have the subframe rate temporally slowed down for one or more subframes that take longer time to be generated without dropping a frame as long as the image data sent out to the display satisfies the display requirement (e.g., subframe rate or average subframe rate being above a threshold frame rate).

As another example, when one or more subframes take longer time to generate, the system may render a smaller number of subframes within an active time period of the master frame clock signal as long as the image data sent out to the display satisfies the display requirement (e.g., number of subframes above a threshold number). Because of the high display speed of the physical display (e.g., μLED display) and the high frame rate for rendering display content (e.g., 1-2 kHz), temporally slowing down the rendering of some subframes or reducing the number of subframes that are to be rendered may not affect the quality of the display content (which may could be effectively perceived by human at about 60 Hz frame rate) as long as the subframe rate and the number of samples meet the display requirements (e.g., subframe rate or average subframe rate being above a threshold frame rate, number of subframes being above a threshold number). In particular embodiments, the system may use the flexible master frame rate to support different kinds of visibility operations at different quality levels depending on perceptional needs of the display content.

In particular embodiments, the system may adopt a flexible rendering schedule (e.g., flexible rendering order of pixels or tiles) for rendering a scene. For example, instead of rendering a scene line by line from top line to bottom line like the traditional displays, the system may render different portions of the scene in an order based on readiness of the respective portions for rendering taking advantage of the μLED display's fast subframe rate and ability to display pixels as they become ready. The system may render the display content organized in tiles (e.g., with each tile including 16 pixels×16 pixels). The display content organized in tiles may be loaded into the row buffer before being sent out to display. For the traditional display which renders the display content line by line, the later portions (e.g., later tiles or later line of pixels) of the scene may have to wait their turns to be rendered even they are ready for rendering. On the other hand, to allow the display to start to render from the first line, the traditional display may have to prepare the display content in the line order and get the display content ready in real-time to catch up the fixed rendering clock. In contrast, particular embodiments of the system may render each portion of the display content in the order of readiness for rendering. When a portion (e.g., one or more tiles of pixels, one or more lines of pixels) is loaded to the row buffer and ready to be sent out, the system may directly send that portion out to the display regardless which portion (e.g., beginning portion, end portion, middle portion, etc.) it belongs to in the scene of the display content. For example, the system may first render the fourth line of pixels before the third line of pixels. As another example, the system may first render a middle portion of the scene before the top or bottom portion of the scene. The system may change the rendering order or rendering frame rate of the subframes as long as the subframes are sent to display within the range of what humans can perceive (e.g., in the millisecond range). By rendering the display content based on the order of readiness for rendering, the system may free the corresponding memory space in the buffer and use the freed memory space for further rendering or computing operations, and therefore dramatically improve the efficiency of memory usage.

As another example and not by way of limitation, a scene of the display content may include one or more complex portions (e.g., with multiple translucent quads or surfaces stacked together) which may need a large amount of computational resources (e.g., memory, computational units, power consumption, etc.) and a long time for the system to determine the corresponding pixel color values. These expensive computation processes may delay the rendering process of other portions if the system does not move on to render other portions until the complex portions are ready, and could negatively impact the quality and experience of the display content. In such situations, the system may temporally skip the complex portions and move on to render other portions of the scene. The system may put one or more placeholder objects (e.g., bubbles) in the positions or areas corresponding these complex portions of the scene. During the process of rendering other portions, the system may continue to process the complex portions parallelly to the rendering process of other portions. The system may render the complex portions and replace the placeholder objects after the complex portions are ready for rendering. By having the flexibility of skipping the complex portions which are expensive to generate and filling in the gaps later, the system may move on to render other portions of the scene without slowing down or delaying the overall rendering process. After a portion has been rendered, the system may free the corresponding computing resources (e.g., buffer memory, computational units, etc.) and re-allocate those resources for processing other complex portions or any other portions, and therefore improve the system performance on the rendering process.

In particular embodiments, when the display engine is processing and sending image data of a portion of a scene to the physical display in a speed faster than the requirement of the physical display, the display engine may have extra computational resources (e.g., memory, bandwidth, computational units, etc.) that can be used for processing data other than the current portion of the scene. In such situations, instead of allowing these extra resources unused, the display engine may dynamically allocate these extra resources to process other portions of the same scene or another scene (e.g., next scene). For example, the display engine may allocate these extra resources to the processes of the complex portions that has been skipped for rendering and render these complex portions to replace the corresponding placeholders after the complex portions are ready for rendering. As another example, the display engine may run ahead to process the portions of the scene that has been scheduled but not started for processing, or to process some portions of a future scene that will be rendered shortly later, taking advantage of the extra computational resources that is available for dynamical allocation. By dynamically allocating the computational resources and having flexible rendering schedule, the system may optimize resource allocation (e.g., memory, time, bandwidth, computational units, power), maximize the utilization of limited computational resources, and improve the system performance for rendering display content.

In particular embodiments, the system may have the flexibility of changing the rendering schedule within a frame (e.g., rendering based on order of readiness, skipping complex portions that take longer time to prepare, running ahead to process portions scheduled later, jumping back to render the formerly skipped portions and replace the placeholders, etc.). Within a rendering frame, the system may use a fixed frame rate with a fixed rendering clock signal when the rendering processes can catch up the clock signal or may use a variable frame rate with a variable rendering clock signal which may allow the system to render some portions with a higher speed and render some other portions with a lower speed. The system may keep the average rendering speed within a threshold range while using the variable rendering clock for the flexible rendering processes. Within a rendering frame, the system may change the order of rendering different portions of the scene. For example, the system may render different portions (e.g., tiles of pixels, lines of pixels, groups of pixels) of the scene based on the order of readiness for rendering (rather than based on their positions in the scene e.g., from left-up corner to right-bottom corner, like traditional display), skip complex portions that take longer time to be processed, run ahead to process portions scheduled later, or may jump back to render the formerly skipped portions and replace the placeholders.

In particular embodiments, the system may have the flexibility of using flexible schedule for processing or rendering multiple mainframes or/and subframes. For processing mainframes, the system may have variable active time periods and variable inactive time periods in the master frame clock while keeping the average master frame rate within a threshold range. For the mainframe that includes more complex details and need longer time for processing and rendering process, the system may allocate more time (e.g., longer active time period) for the rendering process to allow the display content to be ready for rendering to the display. For the mainframe that needs shorter time for rendering process, the system may allocate less time (e.g., shorter active time period) for the processing and rendering process to avoid wasting of computational resources. For rendering the subframes, the system may instruct the display to wait until the rendering process of the current subframe has completed. Or, the system may instruct the display to start render next subframe earlier if the rendering process of the current subframe has been completed earlier. The system may have non-uniform or variable subframe rendering frame rate while keeping the average subframe rate within a threshold range.

In particular embodiments, the system may generate and send different numbers of subframe images to the physical display during an active time period of the master frame clock based on the perceptional needs of the display content. For a scene that requires a lower update rate (e.g., a scene with slow or small change, a scene for user with slow or small head position change), the system may generate a smaller number of subframe images during the active time period and render these subframe images with a lower subframe rate. For a scene that requires a higher update rate, (e.g., a scene with fast or large change, a scene for user with slow or small head position change), the system may generate a larger number of subframe images during the active time period and render these subframe images with a higher subframe rate. By having this flexibility, the system may adaptively and dynamically allocate the computational resources (e.g., time, memory, computational units, power, etc.) based on the perceptional needs of the scene and maximize the efficiency in utilization of the computational resources.

In particular embodiments, the master-subframe rendering mechanism used by the display engine in implementing the graphic pipeline and the high-speed display of the system may enable and support the flexible rendering schedule. For example, the variable master and subframe rate may allow the system to have the flexibility in the rendering process that is not possible for the system with one fixed rendering clock. As another example, the high-speed display (e.g., 1-2 kHz) of the system may allow the system to change the rendering order without affecting the quality of the rendering results. The high-speed display may require a certain number of frames per second to achieve certain brightness but allow many variations, for example, but not limited to, variations in when the frames are sent to the display, variations in exactly which portions of the scene are sent to the display, variations in the width of the interframe time, variations in when the interframe times happen, etc. Thus, the structure and architecture of the system may provide the flexibility that is impossible in the traditional displays and graphics systems. In particular embodiments, the system may provide localized operations, as will described in detail in later sections of this disclosure, which may enable and provide further support for the flexibility in generating and rendering the subframe images based on the perceptional needs and available computational resources.

In particular embodiments, the flexible rendering schedule may allow the system to dynamically allocate the computational resources (e.g., time, buffer, memory, computational units, power, etc.) based on the display needs and the available resources to maximum the display quality and minimize the resource usage and power consumption. The system may render the display content meeting the display quality requirements with substantially less buffer memory usage. Particular embodiments of the system may reduce the amount of buffer memory need for rendering process, which, otherwise, could cause performance cliffs for AR/VR system. For example, when the system needs to render a bunch of quads (even if they're really small) covering a very small portion of the scene, the system may need to stack many tiny quads right on top of each other and could end up with a tile that just takes too long to render. In such situations, the AR/VR system with a hard-real-time rendering clock may fail to meet timing requirement and drop a frame that will negatively impact user experience. In contrast, particular embodiments of the system may use a soft real-time rendering clock which provides the flexibility for the rendering processes. The system may run ahead and continue to fill out the display without dropping a frame or cause seriously delay. The system may come back to the skipped portions and render them in a very short time later (e.g., one to serval micro seconds later, or hundreds of micro seconds later) without affecting the rendering results of the scene. It is notable that hundreds of microseconds may correspond to a very short time period when the subframe image data is rendered to the display at a frame rate of thousand frames per second (e.g., 1-2 kHz) and will not lead to any notable impact on the rendering results (since human are sensitive in the millisecond range).

Figure 4B:
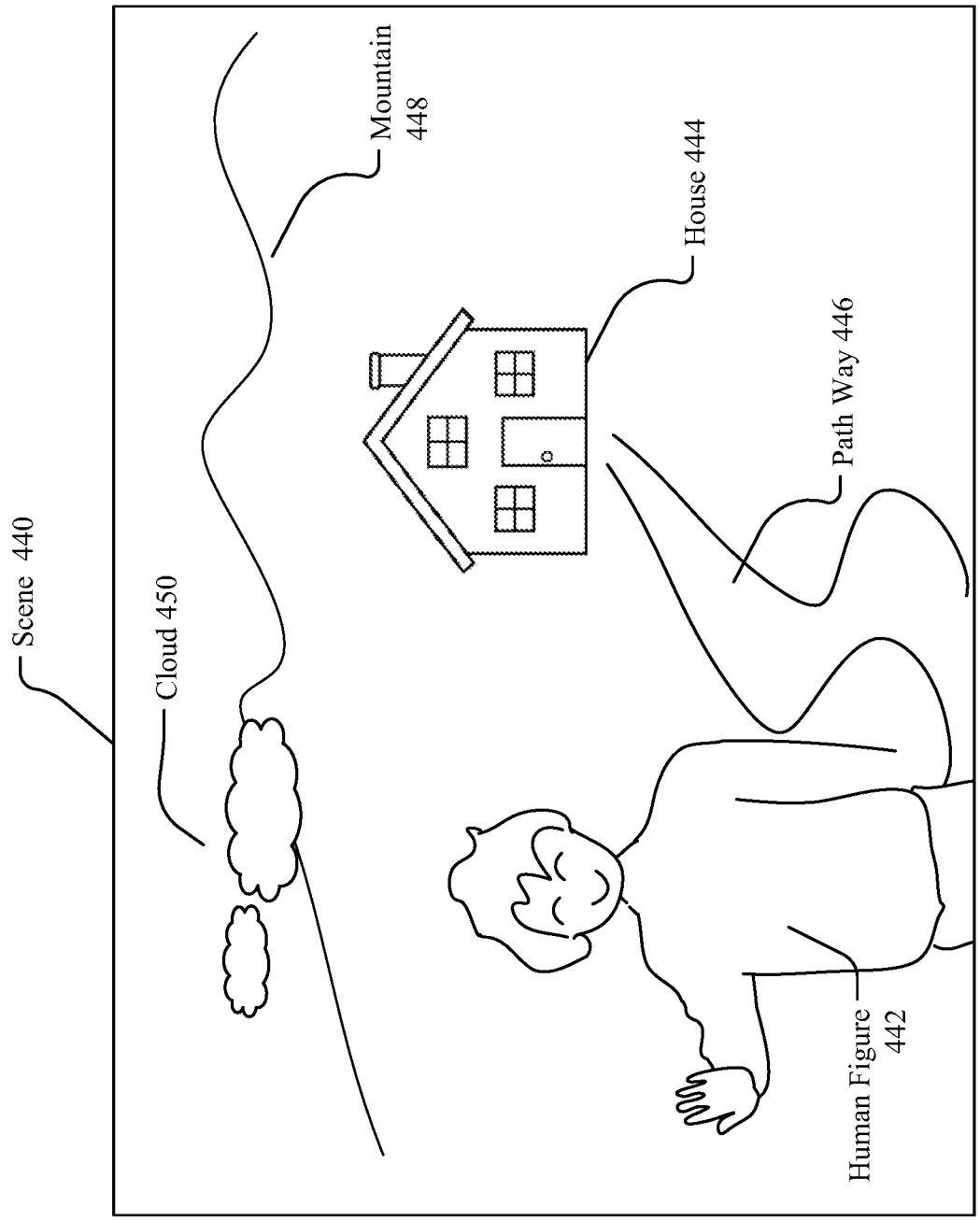
FIG. 4B illustrates an example scene rendered using flexible rendering schedule.

FIG. 4B illustrates an example scene 440 rendered using flexible rendering schedule. As an example and not by way of limitation, the scene 440 may include a human FIG. 442, a house 444, a path way 446, a mountain 448, cloud 450, etc. Instead of rendering the scene 440 in the line order (e.g., start from the top line, move the next line until reach the bottom line), the system may render one or more objects in the scene in the order of readiness for rendering. For example, the portions of the scene 440 corresponding the house 444, which is a static and opaque object, may become ready for rendering at an earlier time than the cloud 450, which are moving and semi-transparent objects. The system may firstly render the portion corresponding the house 444 before rendering the cloud 450 which may take longer time for getting ready for rendering. As another example, the portion of the scene corresponding to the human FIG. 442 may be complex for generating because of the large amount of details and motion associated with human FIG. 442. The system may skip the human FIG. 442 and move on to render other portions of the scene (e.g., the house 444 and the path way 446). The system may continue to process the human FIG. 442 while rendering other portions and may come back to render the human FIG. 442 at a later time (e.g., several micro seconds or hundreds of micro seconds later). As another example, during the rendering process of the mountain 448 (which is a static object), the system may have extra unused resources (e.g., buffer, memory, computational units, etc.). The system may dynamically allocate these resources to process other portions (e.g., the human FIG. 442, the cloud 450) which is scheduled to be rendered at a later time. Using the flexible rendering schedule, the system may optimize the resource allocation and utilization, and improve the system performance related to the display content rendering process.

In particular embodiments described, the display engine may use the full graphic pipeline (e.g., as illustrated in FIG. 3A-B) for generating display data (e.g., subframe images to be rendered at 1-2 kHz frame rate) for the physical display. In the full-pipeline mode, the display rendering process may include one or more steps of a rendering pipeline, such as, receiving mainframes from a central processor, determining visibility and surface/tile pairs, re-sampling the surfaces using the surface/tile pairs and texels, making adjustments for display, etc. The display engine may need to communicate with (e.g., loading mainframe image data) the central processor (e.g., 202 in FIG. 2) and a body-wearable computing system to the texel memory. However, frequent communication between the central processor and the local control units of the display engine could be power consuming and could have negative impact on the battery life of the AR/VR systems. These pipeline steps (e.g., re-sampling step) may not be always necessary for display rendering, especially when the change of the scene/viewpoint is relatively small or slow. In such situations, the display engine could improve the utilization efficiency of computational resources and battery power by using lower-power mode (i.e., frame storage mode) and voiding the expensive re-sampling process.

In particular embodiments, the system may allow the display engine to work in the low-power display rendering mode. The display engine may work in the full-pipeline mode (i.e., direct mode) or the low-power mode (i.e., frame storage mode) for rendering display content based on one or more criteria. For example, the system may determine whether a user motion or a change in the scene is within a threshold range and select the corresponding operation mode accordingly. In the low-power mode, the display engine may use localized rendering operations (e.g., 2D shifting or panning, parallax sub-frame interpolation, generating composite surface) within the local control units of the display engine and minimize the communication to the central control units to reduce power consumption. As discussed in earlier sections, the master-subframe rendering mechanism may use a master frame rate clock including periodical inactive time periods during which the mainframe data may be loaded to the texel memory. When the mainframe data is loaded to the texel memory during the inactive time period, the display engine may have much computational resources (e.g., buffer, memory, computational units) available because the display engine is not rendering the subframes to the display during the inactive time periods. Particular embodiments of the system may unitize the inactive time periods to perform localized operations within the display engine for generating or preparing new subframes, and improve the utilization efficiency of the computational resources. The localized operations of the display engine may be performed by using one or more localized memory and computational units of the display engine without excessive communication with the central control units external to the display engine.

Figure 5A:
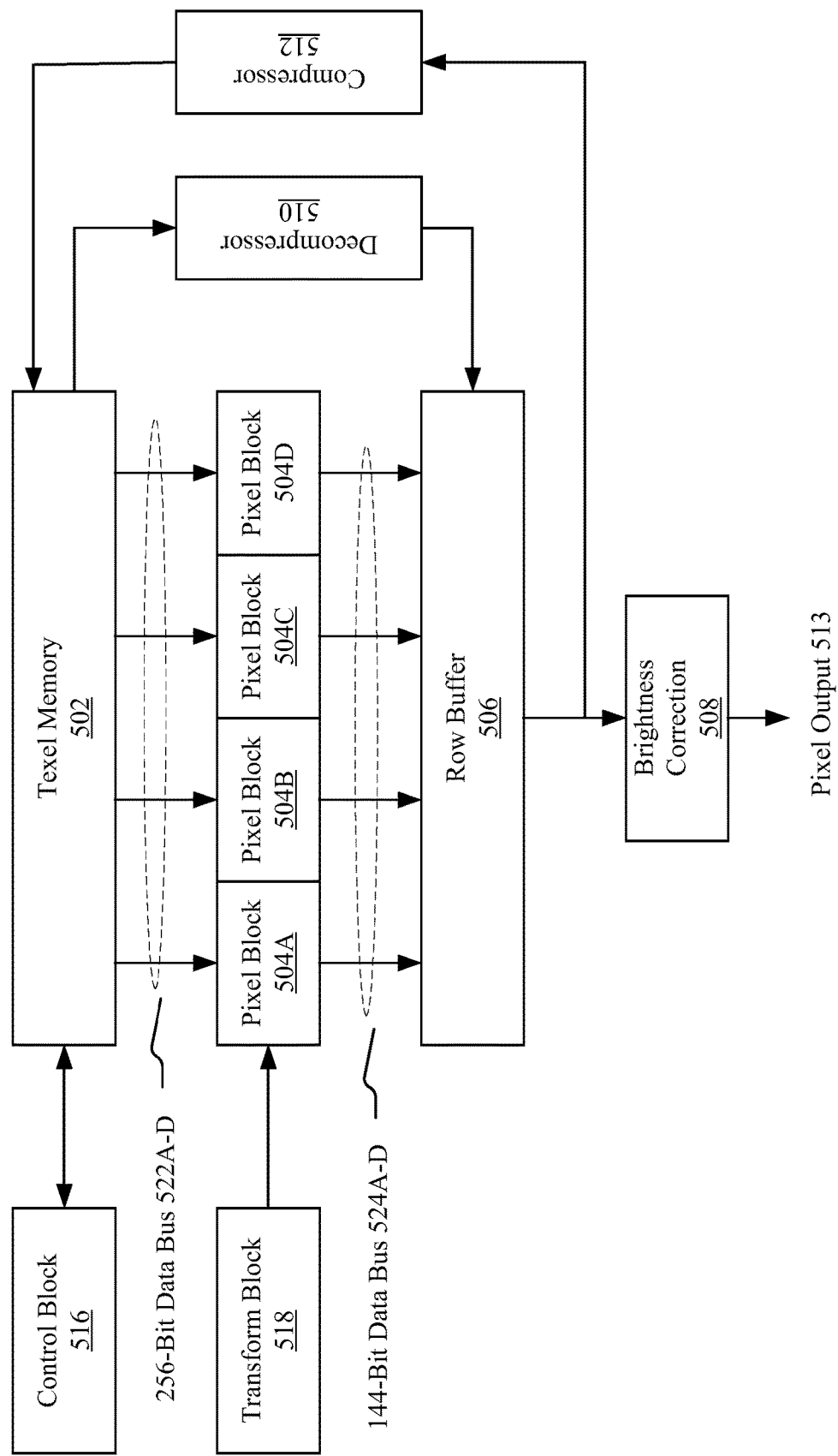
FIGS. 5A-5C illustrate example architectures for low power display engine.
Figure 5B:
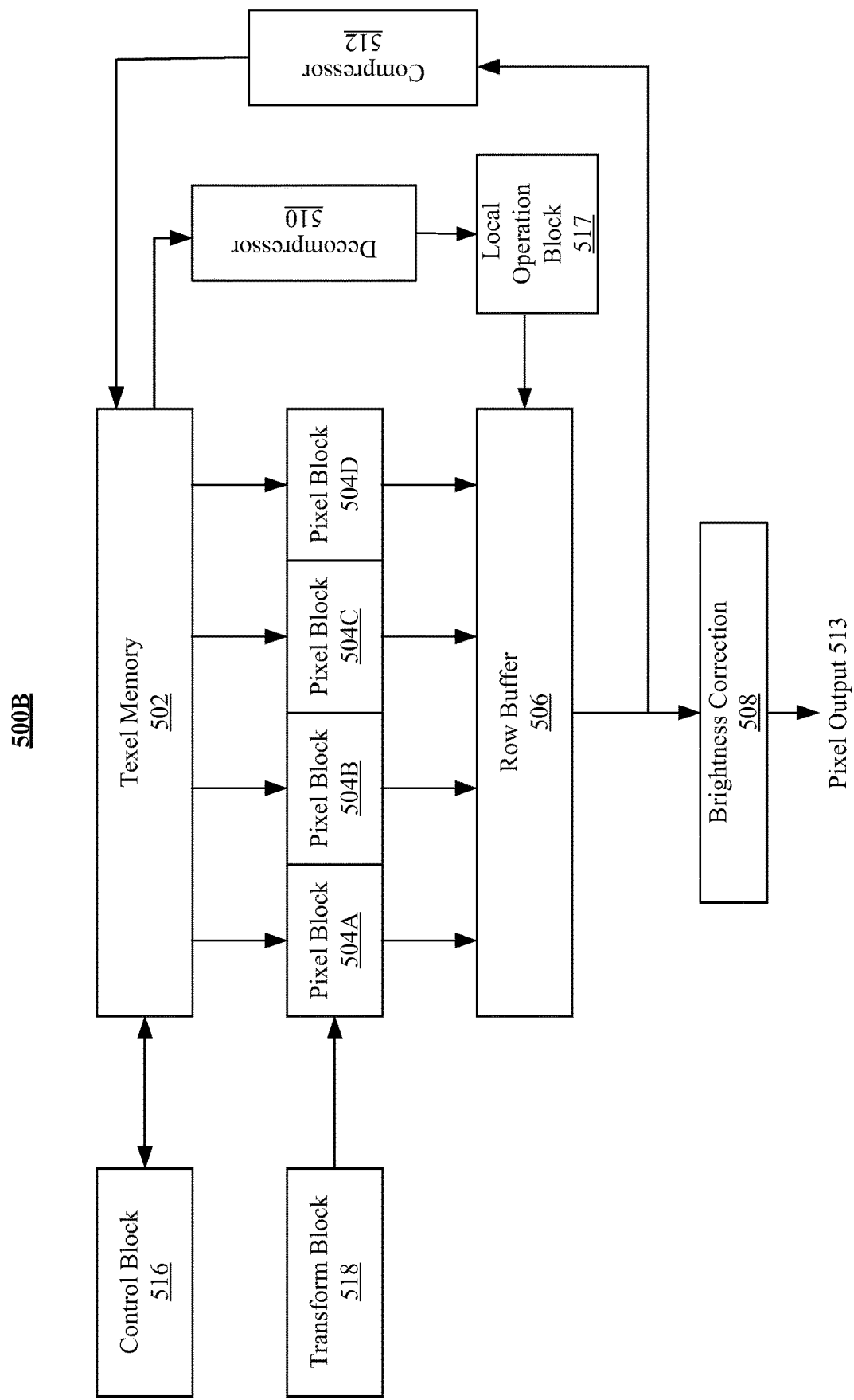
Figure 5C:
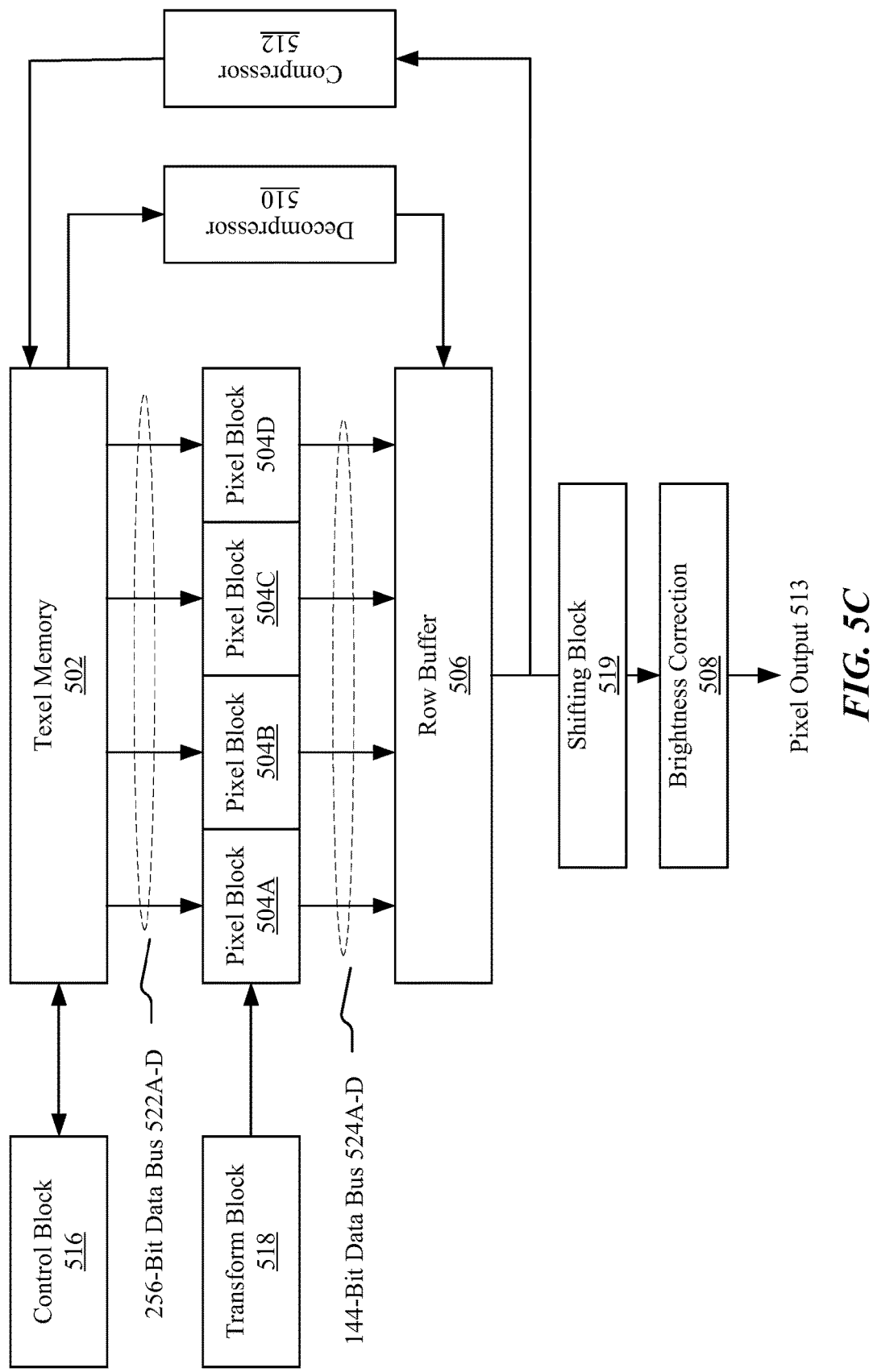

FIGS. 5A-5C illustrate example architectures 500A-C for low power display engine. As shown in FIG. 5A, particular embodiments of the display engine may include a control block 516, a texel memory 502, a transform block 518, one or more pixel blocks (e.g., 504A, 504B, 504C, 504D), a row buffer 506, a brightness correction block 508, a decompressor channel 510, a compressor channel 512, etc. The texel memory 502 may be included within the control block 516 or may be separate memory unit external to the control block 516 but local to the display engine. The row buffer 506 may be included in a display block (e.g., 340A-B in FIG. 3A) or may be separate memory unit external to the display block but local to the display engine. The display engine architecture 500A may correspond to one of the eye display systems (e.g., 212A or 212B in FIG. 2) and the display engine may include two or more sets of components as included in the display engine architecture 500A. In particular embodiments, the display engine architecture 500A may include multiple pixel blocks (e.g., 504A-D) parallel to each other. The parallel pixel blocks 504A-D may connect the texel memory 502 (e.g., via respective 256-bit data bus 522A-D) and the row buffer 502 (e.g., via respective 144-bit data bus 524A-D).

In particular embodiments, to support the low-power display rendering mode, the display engine architecture 500A may include a compressor channel 512 and a decompressor channel 510 which may directly connect the texel memory 502 and the row buffer 506. The texel memory 502 may be loaded with the mainframes periodically (e.g., with 30-90 Hz master frame rate) and the row buffer 506 may host the subframes (e.g., with 1-2 kHz subframe rate) for physical display. During the display rendering process, the mainframe data may be loaded to the texel memory 502 during the inactive time periods of the mainframe rate clock signal. The display engine may first work in the full-pipeline mode to generate subframe image data which could be loaded into the row buffer 506. When the user motion (e.g., view angle or viewpoint change) is below a threshold change, the display engine may switch to the low-power rendering mode (i.e., frame storage mode) to generate new subframe images. The display engine may use the localized low-power display rendering operations (e.g., 2D shifting or panning, parallax sub-frame interpolation, generating composite surfaces) to generate new subframe images without excessive communication with the central processor (which is external to the display engine) of the wearable computing system. For example, the display engine may use the compressor channel 512 to compress the subframes and store the compressed data into the texel memory 502 or into a separate local memory of the display engine during an inactive time period. Then, during the next active time period, the display engine may generate new subframes by accessing and decompressing the stored subframes stored in the texel memory 502 using the localized operations and send the newly generated subframes for rendering. As another example, the display engine may use the compressor channel 512 to compress the subframes and store the compressed data into the texel memory 502 or into a separate local memory of the display engine during an active time period. The display engine may generate new subframe images based on the previously generated subframe images using the localized operations (e.g., 2D shifting or panning, parallax sub-frame interpolation, generating composite surfaces, etc.) and send the new subframe images for display. It is notable that the rendering processes using the localized operations may be performed without excessive communication with the central processor of the wearable computing system, and therefore reduce the power consumption related to the communication between the display engine and the central processor.

In particular embodiments, the localized rendering operations within the display engine may include homography operations which could transmit image to a variety of forms. The localized operations may include, for example, but not limited to, 2D shifting or panning on one or more subframes to generate new subframes, parallax sub-frame interpolation for generating new subframes from new viewpoints, generating composite surfaces, etc. In particular embodiments, the display engine may include a local operation block 517 connecting the decompressor 510 and the row buffer 506, as illustrated in FIG. 5B. The local operation block 517 may receive the decompressed subframes from the decompressor 510 and perform one or more of the localized operations (e.g., 2D shifting or panning, parallax sub-frame interpolation, generating composite surface, etc.). In particular embodiments, the display engine may include a shifting block 507 connecting the row buffer 506 and the brightness correction block 508, as illustrated in FIG. 5C. The shifting block 507 may receive the subframes from the row buffer 506 or the decompressor 510 and perform the 2D shifting or panning operations on the received subframes. In particular embodiments, the system may use localized operations for the processes or operations (e.g., warping surfaces, flatting multiple layers or surfaces, parallax interpolation, reducing motion blur, determining depth of field, etc.) that do not need to be performed at the high frame rate of subframe rate (e.g., 1-2 kHz). In particular embodiments, the display engine may support localized operations which may be included within a single chip and can be performed without inter-chip communication to reduce power consumption.

Figure 6A:
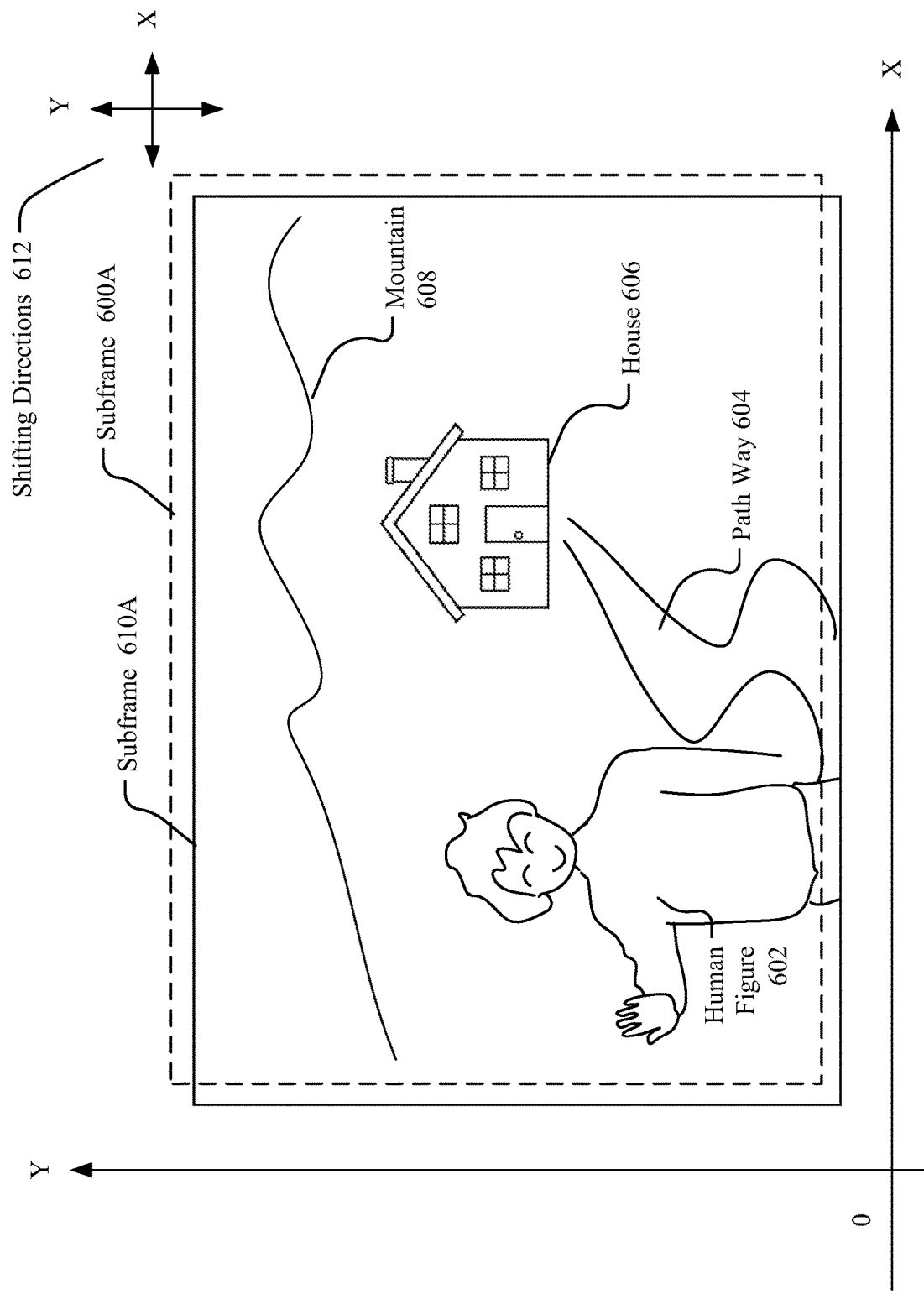
FIG. 6A illustrates an example subframe generated using localized 2D shifting process of the display engine.

FIG. 6A illustrates an example subframe 600A generated using localized 2D shifting process of the display engine. In particular embodiments, the display engine may first work in the full-pipeline mode to generate subframe image data and store the subframe image data in the row buffer. The display engine may first receive (e.g., at the control block) mainframe image data (e.g., one or more surfaces, texels) from a central processor of the wearable computing system and store the received mainframe image data within the texel memory. Then, the display engine may determine (e.g., using the transform block) the visibility of the surfaces by determining the surface-tile pairs using ray casing method. After that, the display engine may (e.g., using the pixel block) re-sample the surfaces using the surface/tile pairs and corresponding texels accessed from the texel memory to determine the pixel color values. The display engine may generate one or more subframe images to be rendered to physical display at the subframe rate of 1-2 kHz. The generated subframes may be stored within the row buffer of the display block. Then, the display engine may apply color correction to the subframes and send the display data to the physical display (e.g., µLED backplane units).

After the subframe has been generated by the full-pipeline process and loaded into the row buffer, the display engine may compress and store one or more subframes into the texel memory using the compressor channel connecting the texel memory and the row buffer. When the viewpoint of the user or the displayed scene does not change drastically (e.g., the change of the viewpoint or displayed scene is within a threshold range), the display engine may not need to re-run the full-pipeline (including the resampling and recomposing processes) to generate the next subframe. Since the change of the user viewpoint or display scene is small, the next subframe may be generated based on a 2D shifting or panning operation on the former subframe(s). Thus, the display engine may generate next subframe by accessing and decompressing the compressed subframes stored in the texel memory using the decompressor channel and simply shifting the accessed subframe.

As an example and not by way of limitation, the subframe 600A may be a decompressed subframe by the decompressor. The display engine may detect a small change in the user's head position, eye position, or gazing point and determine that the next subframe could be generated by shifting the subframe 600A to the position of the subframe 610A. The shifting may be along one or both X and Y directions (e.g., horizontal and vertical direction) of the 2D space. Thus, for generating the next subframe, the display engine may not need to perform the costly operations (e.g., re-sampling operations) associated with the full-pipeline process, and therefore reduces the power consumption for display rendering. The display engine may generate the next subframe in this way during the inactive time period or active time periods of the master frame clock signal. The newly generated subframes may be rendered to the physical display (e.g., at a subframe rate of 1-2 kHz) during the active time period of the master frame rate clock signal.

In particular embodiments, the 2D shifting operation may be performed within the row buffer (e.g., 506 in FIG. 5A), or by a local operation block (e.g., 517 in FIG. 5B) on the output from the decompressor channel to the row buffer, or by a separate shifting block (e.g., 519 in FIG. 5C) on the output from row buffer to display block. For the localized 2D shifting operations, the display engine may warp an initial unwrapped frame into a position for display. The display engine may compress and store the warped frame into the texel memory or a separate local memory through the compressor channel. Then, the display engine may access and decompress the compressed frame from the memory and shift the decompressed frame in the 2D space based on the viewpoint or view angle (e.g., as determined by head position or/and eye position) of the user and send the shifted frame to display. When the change if the viewpoint or view angle is beyond a threshold range, the appropriate subframe may not be generated by simple 2D shifting operations. In such situations, the display engine may re-warp the initial frame to generate next subframe using one or more processes of the full pipeline mode. For example, the system may use ray casting process to generate an arbitrary warp of the initial frame.

Figure 6B:
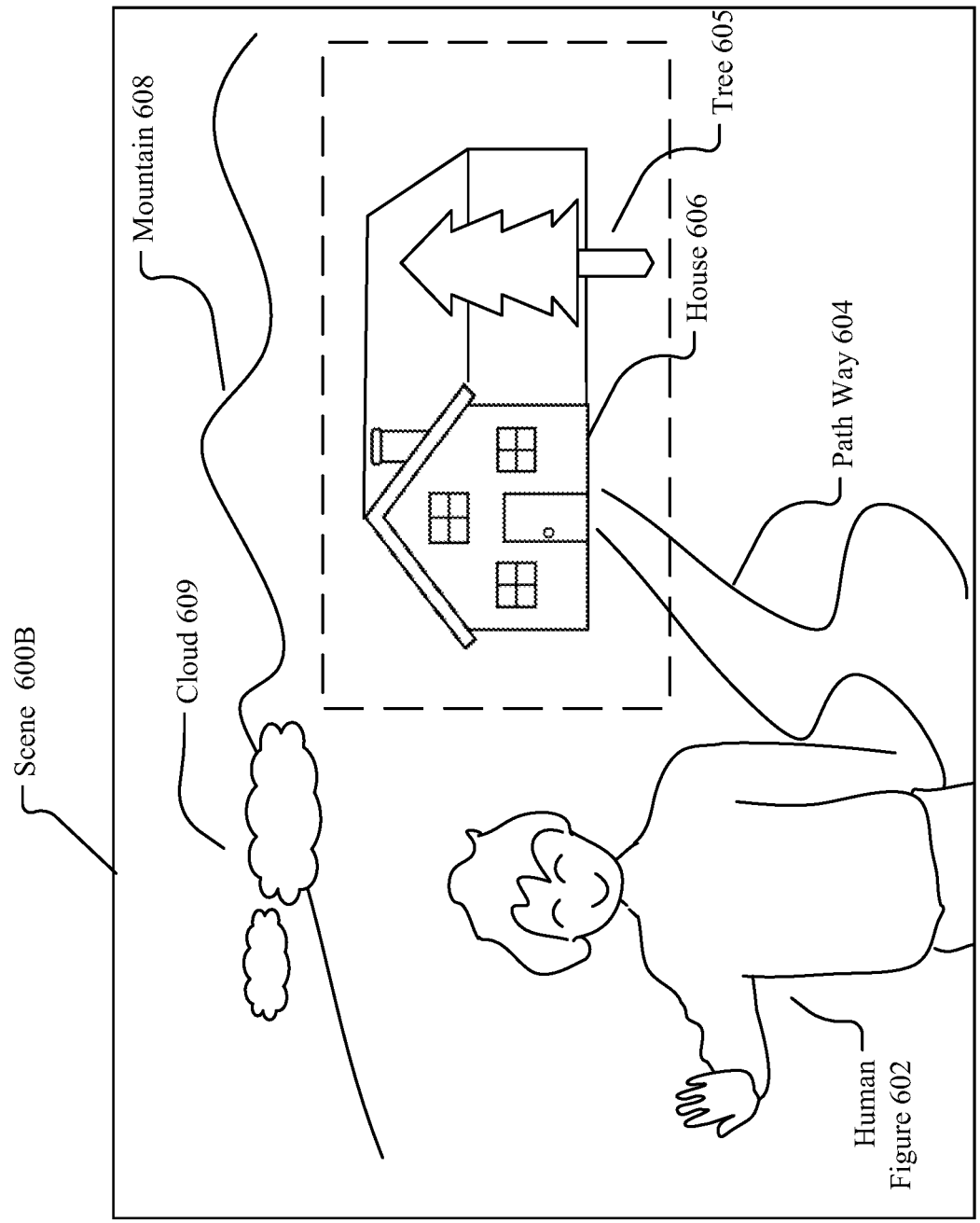
FIG. 6B illustrates an example scene generated using localized compositing process of the display engine.

FIG. 6B illustrates an example scene 600B generated using localized compositing process of the display engine. As an example and not by way of limitation, the scene 600B may include a human FIG. 602, a house 604, a tree, 605, a path way 606, a mountain 608, cloud 609, etc. The scene 600B may include multiple layers of surfaces corresponding respective objects. For example, the human FIG. 602, the house 606, the tree 605, the path way 604, the mountain 608, and the cloud 609 may each correspond to a separate surface and a separate layer. Some surfaces (e.g., the cloud 609, the tree 506) may be translucent or semi-transparent and may be stacked on surfaces of other objects (e.g., the mountain 608, the house 606). Stacked translucent or semi-transparent surfaces could be expensive for the display engine to rendering. The display engine may need to read large amount of texel data corresponding to each of stacked surfaces to determine the pixel color values and could consume much power during the frequent texel memory reading operations. In particular embodiments, the display engine may use the localized compositing operations to composite two or more surfaces which within the same depth range (e.g., depth being within a threshold range) or/and X-Y coordinate range into a simplified surface. In other words, the display engine may flatten multiple layers of surfaces in the 3D space of the scene into generate a single layer of flattened surface, which needs less power to be rendered at high frame rate (e.g., 1-2 kHz). The system may generate composite surfaces by combining multiple surfaces that are within same depth range or/and same X-Y coordinate range. For example, the house 606 and the tree 605 in the scene 600B may be close to each other in the depth and may be composited into a single layer of flattened surface. As another example, the cloud 609 and the mountain 608 may be close to each other in the depth and may be composited into a single layer of flattened surface. In particular embodiments, the system may store the compressed subframes in the texel memory or a separate local memory of the computing system. In particular embodiments, these composite surfaces and the corresponding texel data may be used to generate the next subframe by applying 2D shifting operations or by applying one or more process (e.g., resampling process) of the full graphic pipeline. Even one or more steps (e.g., resampling by pixel block) or whole graphic pipeline may be used to resample the composite surfaces, the reduction in the number of surfaces would improve the system performance and reduce the power consumption by eliminating the redundant reads to the texel memory when determining the pixel color values.

In particular embodiments, the display engine may need to render a stack of surfaces (e.g., 16 layers of surfaces) with one layer on the top of another layer. The high subframe rendering rate may limit available time for the compositing operations of these surfaces and therefore make the compositing process very difficult to finish in real-time. The display engine may use the inactive time periods of the master frame clock to perform the compositing operations. For example, the display engine may select a foreground batch of surfaces and a background batch of surfaces, composite them into two a foreground surface and a background surface for rendering. The composited surfaces could be approximation of the original surfaces and could be processed and rendered with less computational resources (because there is less surfaces). As another example, the display engine may select a number of pairs of surfaces which are at the same depth and composite each pair of surfaces into a single surface for rendering. The display engine may use a depth map for all the surfaces of a scene to determine which pair of surfaces are close to each other (e.g., within a threshold depth range). As another example, the display engine may select the surfaces which overlap with each other for at least a portion and composite these surfaces into a single surface for rendering. In particular embodiments, the system may render all of the surfaces of every frame from particular viewpoints as determined using the full graphic pipeline (e.g., ray casting process). For the surfaces that are composited into a signal surface by the display engine, the ability to render parallax between them may be lost. Particularly embodiments of the system may selectively composite the surfaces that are unlikely to be used for parallax interpolation (e.g., surfaces that are close to each other in depth) into a single surface.

FIG. 6C illustrates an example process for generating new subframe using parallax interpolation. In particular embodiments, the system may use information outside the field view to combine multiple views of the world as seen from different parallaxes into a view from a particular viewpoint or view angle. The system may generate and store two subframes of the scene as viewed by a camera or a user from two particular viewpoints or view angles. Then, the system may use a parallax interpolation operation on two subframes to create a new scene from a new point view or point angle. The new scene may be warped based on the actual depths of objects in the world space. As an example and not by way of limitation, the display engine may use the full-pipeline to generate the subframe 620A from a first viewpoint and the subframe 620B from a second viewpoint. The subframe 620A and 620B may include the same object (e.g., house 622A-B) viewed from different viewpoints or view angles. The generated subframe 620A and 620B may be loaded into row buffer for rendering to the display. The system may use the compressor channel to compress the two subframes of 620A and 620B and store the compressed subframes into the texel memory. Then, during the active time periods of the master frame clock, the system may access the two compressed subframes from the texel memory, decompress them using the decompressor channel, and generate next subframe 620C from a third viewpoint using parallax interpolation based on the decompressed subframe 620A-B from the first and second viewpoints instead of performing the full resampling process. The third viewpoint may correspond to the current user head position or eye position relative to the scene being displayed. Using the localized parallax interpolation, the display engine may generate new subframe from new viewpoint in the 3D space without excessive communication to the control units external to the display engine and without using the full graphic pipeline, and therefore reduces the power consumption associated with the rendering process. In particular embodiments, the system may perform the parallax interpolation based on an interpolated grid at a lower frame rate than the subframe rendering rate (e.g., 1-2 kHz). The parallax interpolation may be performed within the display engine utilizing the local memory and computational units of the display engine without excessive communication to the control units external to the display engine.

Figure 7:
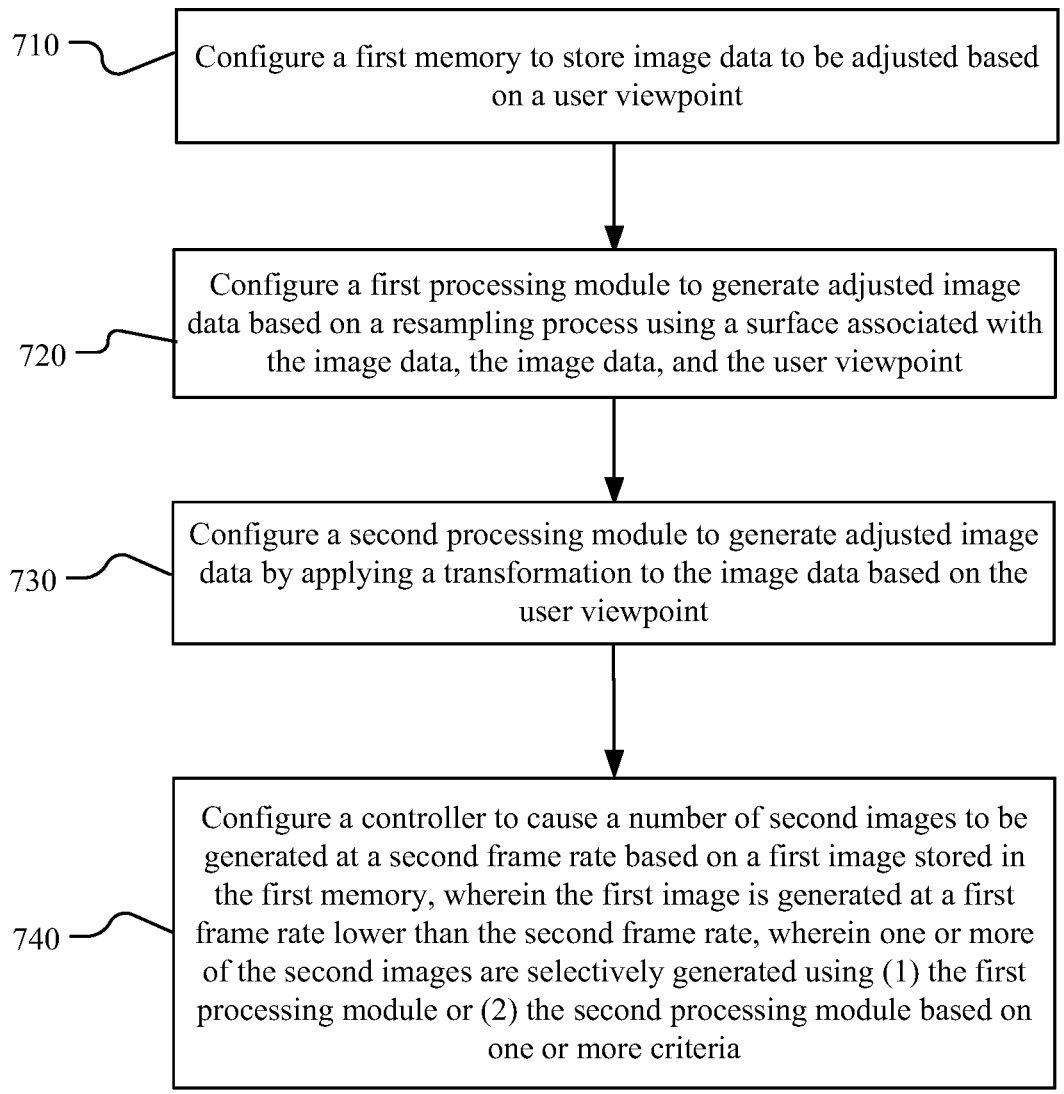
FIG. 7 illustrates an example method for configuring the computing system to generate subframe images using different processing modules.

FIG. 7 illustrates an example method 700 for configuring the computing system to generate subframe images using different processing modules. The method 700 may begin at step 710, where the computing system may configure a first memory to store image data to be adjusted based on a user viewpoint. At step 720, the system may configure a first processing module to generate adjusted image data based on a resampling process using a surface associated with the image data, the image data, and the user viewpoint. At step 730, the system may configure a second processing module to generate adjusted image data by applying a transformation to the image data based on the user viewpoint. At step 740, the system may configure a controller to cause a number of second images to be generated at a second frame rate based on a first image stored in the first memory. The first image may be generated at a first frame rate lower than the second frame rate. One or more of the second images may be selectively generated using (1) the first processing module or (2) the second processing module based on one or more criteria.

In particular embodiments, the first memory may be the texel memory or a separate local memory of the computing system. The image data stored in the first memory may include the mainframe image data and the compressed subframe image data for local transformation operations. The first image may be one of the mainframe images generated at the mainframe frame rate and stored in the texel memory. The second images may be the subframe images generated at the subframe frame rate which may be a higher frame rate (e.g., 1-2 kHz) than the mainframe frame rate (e.g., 30-90 Hz). The adjusted image data may be associated with one or more subframe images. The subframe image(s) may be stored (after being compressed) at the texel memory or the separate local memory of the computing system for transformation operations.

In particular embodiments, the system may determine whether a system status meets one or more criteria and use different processing modules to generate the subframe images accordingly. In particular embodiments, the one or more criteria may include a threshold range for a change of the user viewpoint or view angle. The system may use a controller to determine whether a change of the user viewpoint is within the threshold range. When the change of the user viewpoint is within the change threshold, the system may generate one or more of the second images using the second processing module. In particular embodiments, the second processing module may include a compressor channel and a decompressor channel which connect the first memory (e.g., texel memory or a separate local memory) and a second memory (e.g., row buffer). In particular embodiments, the system may generate and store at least one subframe image in the second memory. The system may use the compressor channel to compress at least one second image and store the compressed at least one second image in the first memory. The system may use he decompressor channel to decompress the compressed second image(s) accessed from the first memory and generate the one or more second images based on the decompressed image(s).

In particular embodiments, when the change of the user viewpoint is beyond the threshold range, the system may generate one or more second images using the first processing module based on a resampling process. The system may use the first processing module to determine one or more surface-tile pairs for one or more surfaces of the first image using a ray casting method. Then, the system may use the first processing module to determine a color value for each pixel of the one or more of the second images based on the surface-tile pairs of the first image and a mipmap. In particular embodiments, the one or more criteria may include a power level threshold. The system may determine whether the system power level is below the threshold power level and select different processing modules to generate the second images. For example, the system may use the second processing module to generate the second images (which is less power consuming than the first processing module) when the system power level is below the power level threshold. The system may use the first processing module to generate the second images (which is more power consuming than the second processing module) when the system power level is above the power level threshold.

In particular embodiments, the transformation of the image data may include one or more local transformative operations of the computing system. As an example and not by way of limitation, the transformation may include shifting at least one second image along one or two dimensions in a two-dimensional space. As another example, the transformation may include interpolating two second images associated with two viewpoints to generate a new second image. The newly generated second image may be associated with a new viewpoint different from the two viewpoints of the two second images. As another example, the transformation may include compositing two or more surfaces which are close to each other in depth (e.g., having depth values with a threshold range) associate with a second image into a new surface.

In particular embodiments, the system may render the subframe images on a display with a flexible rendering schedule and a flexible frame rate. The master frame rate and subframe frame rate may be variable frame rates while keeping the display quality of the rendered content. In particular embodiments, the subframe frame rate may be variable based on one or more of, a user motion, a user motion speed, a viewpoint change speed, a readiness level of a portion of a second image, a readiness level of a second image, etc. For example, when the user motion speed is above a threshold speed, the system may use a higher subframe frame rate. When the user motion speed is below a threshold speed, the system may use a lower subframe frame rate. As another example, when the subframe images have complex portions and take longer time for processing and rendering, the system may use a lower subframe frame rate. As long as the display content is rendered at a frame rate higher than the requirement of the human vision, the system may keep the display quality of the rendered content while using a flexible subframe rate.

In particular embodiments, the system may render a number of second images on a display at the second frame rate. The system may render a first portion of a current second image of the second images before a second portion of the current second image when the first portion is ready for rendering before the second portion. In particular embodiments, during the rendering process, the system may skip a portion of a current second image and render a placeholder object in the area corresponding to the skipped portion. The system may render other portions of the current second image while parallelly processing the skipped portion and render the skipped portion of the current second image after it becomes ready for rendering.

In particular embodiments, during the rendering process, the system may allocate one or more computational resources to run ahead to process a complex portion of a current second image even though that complex portion may be scheduled to be processed at a later time. The system may render the complex portion of the current second image after it becomes ready for rendering. In particular embodiments, the system may configure the controller to instruct the display to wait for a period of time while processing one or more complex portions of a current second image and render the one or more complex portions of the current second image after the processing of the one or more portions of the current second image has completed. In particular embodiments, the system may instruct the display to wait for a period of time while processing and rendering a current subframe image and render a next subframe image after the rendering of the current subframe image has completed.

In particular embodiments, the computing system may be a display engine of AR/VR systems and the first memory may be the texel memory of the display engine. The display engine may receive mainframe images from a controller external to the display engine and store the mainframe images in the texel memory. The mainframe images may be generated and received at a first frame rate of 30-90 Hz. The display engine may access the mainframe images for generating the subframe images at a second frame rate in the range of 1-2 kHz. The system may determine whether a user motion satisfies a threshold criterion to select the operation mode accordingly. For example, the system may determine whether a user motion (e.g., motion speed, head position, view angle, hand gesture, body gesture, finger position on controller, etc.) exceeds or below a motion threshold. For example, the system may determine whether the motion speed of the user exceeds a motion speed threshold. As another example, the system may determine whether a change of the user head position or view angle is above or below a threshold change. As another example, the system may determine whether a change of a hand gesture, a body gesture, or a finger motion (e.g., on controller) exceeds a respectively threshold change. In particular embodiments, the system may determine whether a change in the scene (e.g., view angle change of scene relative to the viewer, content change of the scene, etc.) satisfies a threshold criterion to select corresponding operation mode.

In particular embodiments, the system may select an operation model from a first operation mode (e.g., the full pipeline operation mode) and a second operation mode (e.g., the frame storage mode) based the determination whether the user motion or/and the change in the scene satisfies the corresponding threshold criteria. For example, when the user motion is above the motion threshold, the system may select the first operation model which is associated with a full pipeline resampling process for generating subframe images. When the user motion is below the motion threshold, the system may select the second operation model which may use one or more localized transformative operations to generate the subframe images. As another example, when the change in the scene is above a change threshold, the system may select the first operation model associated with the full pipeline resampling process. When the change in the scene is below a change threshold, the system may select the second operation mode using the localized transformative operations.

In particular embodiments, when the selected operation model is the first operation model, the system may generate a number of subframe images at the second frame rate (which is higher than the first frame rate) using a resampling process. A mainframe image may include one or more 3D surfaces. The resampling process may include, for example, determining one or more surface-tile pairs for one or more surfaces of the mainframe image using a ray casting method and determining a color value for each pixel of the subframe images based on the one or more surface-tile pairs of the mainframe image and a mipmap. When the selected operation model is the second operation model, the system may generate at least one subframe image based on the mainframe image and generate remaining subframe images by transforming the at least one subframe image.

In particular embodiments, the system may store subframe images in the row buffer memory. The system may compress one or more subframe images using a compressor channel. The system may store one or more compressed subframe images in the texel memory or a separate memory local to the display engine. The system may decompress, using a decompressor channel, the compressed subframe images stored in the texel memory or separate local memory and generate the remaining subframe images based on one or more decompressed subframe images. For example, the system may generate one or more remaining subframe images by shifting the at least one second image along one or two dimensions in a two-dimensional space. As another example, the system may interpolate a first subframe image associated with a first view angle and a second subframe image associated with a second view angle to generate a new subframe image associated with a third view angle. In particular embodiments, the system may transform the subframe image by compositing two or more surfaces, that have similar depth (e.g., having depth within a threshold range to each other) of a subframe image into a new surface and generate new subframe image based on the subframe images including the composited surfaces. In particular embodiments, the transformative operation may be performed by a local operation block on an output path from a decompressor channel to the row buffer memory unit or a local operation block on an output path of the row buffer memory unit to display blocks.

Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for configuring the computing system to generate subframe images using different processing modules including the particular steps of the method of FIG. 7, this disclosure contemplates any suitable method for configuring the computing system to generate subframe images using different processing modules including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Figure 8:
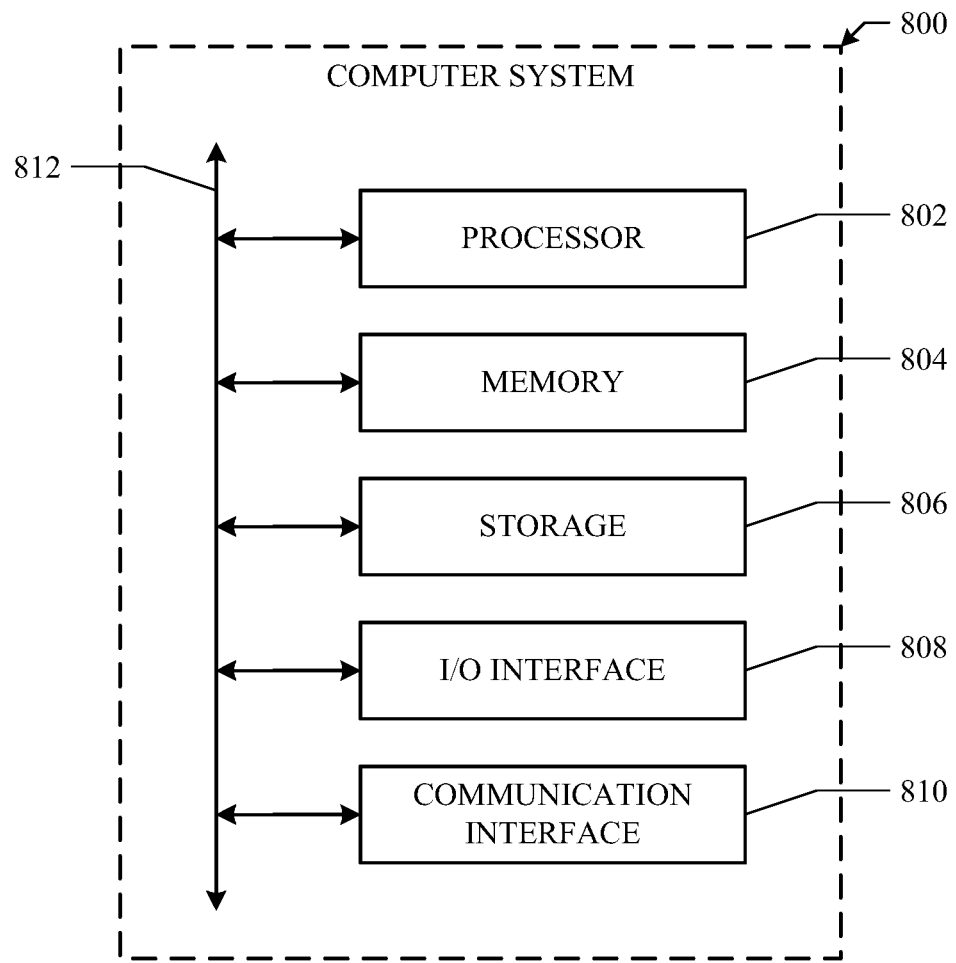
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A computing system comprising:
   a first memory configured to store image data to be adjusted based on a user viewpoint;
   a first processing module configured to generate adjusted image data based on a resampling process using a surface associated with the image data, the image data, and the user viewpoint;
   a second processing module configured to generate adjusted image data by applying a transformation to the image data based on the user viewpoint; and
   a controller configured to cause a plurality of second images to be generated at a second frame rate based on a first image stored in the first memory, wherein the first image is generated at a first frame rate lower than the second frame rate, wherein one or more of the second images are selectively generated using (1) the first processing module or (2) the second processing module based on one or more criteria.

2. The system of claim 1, wherein the one or more criteria comprise a threshold range, wherein the controller determines whether a change of the user viewpoint is within the threshold range, and wherein the one or more of the second images are generated using the second processing module when the change of the user viewpoint is within the change range.

3. The system of claim 2, wherein the second processing module comprises a compressor channel and a decompressor channel, and wherein the compressor channel and the decompressor channel connect the first memory and a second memory.

4. The system of claim 3, wherein at least one second image is stored in the second memory, wherein the at least one second image is compressed by the compressor channel, wherein the compressed at least one second image is stored in the first memory, and wherein the one or more of the second images are generated based on the compressed at least one second image stored in the first memory.

5. The system of claim 2, wherein the one or more of the second images are generated using the first processing module when the change of the user viewpoint is beyond the threshold range.

6. The system of claim 5, wherein the first processing module determines one or more surface-tile pairs for one or more surfaces of the first image using a ray casting method, and wherein the first processing module determines a color value for each pixel of the one or more of the second images based on the one or more surface-tile pairs of the first image and a mipmap.

7. The system of claim 1, wherein the transformation of the image data comprises shifting at least one second image along one or two dimensions in a two-dimensional space.

8. The system of claim 1, wherein the transformation comprises interpolating two second images associated with two viewpoints to generate a new second image, and wherein the new second image is associated with a new viewpoint different from the two viewpoints of the two second images.

9. The system of claim 1, wherein the transformation comprises compositing two or more surfaces of at least one second image into a new surface, and wherein the two or more surfaces have depth values within a threshold range.

10. The system of claim 1, wherein the second frame rate is variable based on one or more of:
   a user motion;
   a user motion speed;
   a viewpoint change speed;
   a readiness level of a portion of a second image; or
   a readiness level of a second image.

11. The system of claim 1, wherein the plurality of second images are rendered on a display at the second frame rate, wherein a first portion of a current second image of the plurality of second images is rendered before a second portion of the current second image, and wherein the first portion is ready for rendering before the second portion.

12. The system of claim 1, wherein the plurality of second images are rendered on a display at the second frame rate using a rendering process, wherein a portion of a current second image is skipped during the rendering process, wherein a placeholder object is rendered in an area corresponding to the skipped portion, wherein other portions of the current second image are rendered while parallelly processing the skipped portion, and wherein the skipped portion of the current second image is rendered after being ready for rendering.

13. The system of claim 1, wherein the plurality of second images are rendered on a display at the second frame rate using a rendering process, wherein, during the rendering process, one or more computational resources are allocated for processing a portion of a current second image which is scheduled to be processed at a later time, and wherein the portion of the current second image is rendered after being ready for rendering.

14. The system of claim 1, wherein the plurality of second images are rendered on a display at the second frame rate using a rendering process, wherein the controller is further configured to:
   instruct the display to wait for a period of time while processing one or more portions of a current second image; and
   render the one or more portions of the current second image after the processing of the one or more portions of the current second image has completed.

15. One or more computer-readable non-transitory storage media embodying software that is operable when executed to:
   configure a first memory to store image data to be adjusted based on a user viewpoint;
   configure a first processing module to generate adjusted image data based on a resampling process using a surface associated with the image data, the image data, and the user viewpoint;
   configure a second processing module to generate adjusted image data by applying a transformation to the image data based on the user viewpoint; and
   configure a controller to cause a plurality of second images to be generated at a second frame rate based on a first image stored in the first memory, wherein the first image is generated at a first frame rate lower than the second frame rate, wherein one or more of the second images are selectively generated using (1) the first processing module or (2) the second processing module based on one or more criteria.

16. The media of claim 15, wherein the one or more criteria comprise a threshold range, and wherein the software that is further operable when executed to:
   determine whether a change of the user viewpoint is within the threshold range, wherein the one or more of the second images are generated using the second processing module when the change of the user viewpoint is within the threshold range.

17. The media of claim 16, wherein the one or more second images are generated using the first processing module when the change of the user viewpoint is beyond the threshold range.

18. A method comprising, by a computing system:
   configuring a first memory to store image data to be adjusted based on a user viewpoint;
   configuring a first processing module to generate adjusted image data based on a resampling process using a surface associated with the image data, the image data, and the user viewpoint;
   configuring a second processing module to generate adjusted image data by applying a transformation to the image data based on the user viewpoint; and
   configuring a controller to cause a plurality of second images to be generated at a second frame rate based on a first image stored in the first memory, wherein the first image is generated at a first frame rate lower than the second frame rate, wherein one or more of the second images are selectively generated using (1) the first processing module or (2) the second processing module based on one or more criteria.

19. The method of claim 18, wherein the one or more criteria comprise a threshold range, further comprising:
   determining whether a change of the user viewpoint is within the threshold range, wherein the one or more of the second images are generated using the second processing module when the change of the user viewpoint is within the threshold range.

20. The method of claim 19, wherein the one or more second images are generated using the first processing module when the change of the user viewpoint is beyond the threshold range.

* * * * *